US009658243B2

(12) United States Patent
Shirakata et al.

(10) Patent No.: US 9,658,243 B2
(45) Date of Patent: May 23, 2017

(54) SYSTEM FOR ALARMING A DRIVER USING A DRIVER STATE ESTIMATION DEVICE

(71) Applicants: HONDA MOTOR CO., LTD., Tokyo (JP); NATIONAL UNIVERSITY CORPORATION KANAZAWA UNIVERSITY, Kanazawa-shi, Ishikawa (JP)

(72) Inventors: Tetsuro Shirakata, Wako (JP); Yoichi Sugimoto, Wako (JP); Hiroshi Tokutake, Kanazawa (JP)

(73) Assignees: HONDA MOTOR CO., LTD., Tokyo (JP); NATIONAL UNIVERSITY CORPORATION KANAZAWA UNIVERSITY, Kanazawa-Shi (JP)

(*) Notice: Subject to any disclaimer, the term of this patent is extended or adjusted under 35 U.S.C. 154(b) by 736 days.

(21) Appl. No.: 14/081,260

(22) Filed: Nov. 15, 2013

(65) Prior Publication Data
US 2014/0142867 A1  May 22, 2014

(30) Foreign Application Priority Data

Nov. 16, 2012 (JP) ................ 2012-252020
Nov. 16, 2012 (JP) ................ 2012-252021
Nov. 16, 2012 (JP) ................ 2012-252022

(51) Int. Cl.
*G01P 13/00* (2006.01)
*B60W 50/00* (2006.01)
(Continued)

(52) U.S. Cl.
CPC ............ *G01P 13/00* (2013.01); *B60W 40/08* (2013.01); *B60W 50/0098* (2013.01);
(Continued)

(58) Field of Classification Search
CPC combination set(s) only.
See application file for complete search history.

(56) References Cited

U.S. PATENT DOCUMENTS

2009/0033501 A1* 2/2009 Chen .................. A61B 5/18
340/576
2010/0182139 A1* 7/2010 Chen .................. B62D 15/029
340/435
(Continued)

FOREIGN PATENT DOCUMENTS

DE  10 2004 047 136  4/2006
DE  10 2009 047 323  6/2011
(Continued)

OTHER PUBLICATIONS

European Search Report dated Mar. 21, 2014.

*Primary Examiner* — Ricky Ngon
(74) *Attorney, Agent, or Firm* — Rankin, Hill & Clark LLP

(57) ABSTRACT

In a first arousal level estimation device according to this invention, an initial residual setup unit sets a residual to be a reference of a driver, i.e., a residual with a smallest value during an initialization period as an initial residual among residuals calculated by a residual calculation unit during the initialization period from timing of starting an operation of a vehicle or timing of a change in a traveling scene including a condition of traveling road of the vehicle as a starting point till a predetermined period of time elapses. An arousal level estimation unit estimates a driver's arousal level based on a result of comparison between the initial residual set by the residual setup unit and the residual calculated by the residual calculation unit after the initialization period has elapsed. In this way, an estimation accuracy relating to a driver's state including a driver's arousal level is improved.

20 Claims, 18 Drawing Sheets

(51) Int. Cl.
*B60W 40/08* (2012.01)
*B60W 40/09* (2012.01)
(52) U.S. Cl.
CPC ..... *B60W 40/09* (2013.01); *B60W 2040/0827* (2013.01); *B60W 2040/0872* (2013.01); *B60W 2050/0029* (2013.01); *B60W 2050/0088* (2013.01); *B60W 2050/0089* (2013.01)

(56) References Cited

U.S. PATENT DOCUMENTS

2012/0290169 A1 11/2012 Zeng et al.
2014/0005906 A1\* 1/2014 Pandita ................ B60W 30/17
701/96

FOREIGN PATENT DOCUMENTS

| EP | 2 472 493 | 7/2012 |
| JP | 2007272834 | 10/2007 |
| JP | 2009018765 | 1/2009 |
| JP | 2009073462 | 4/2009 |
| JP | 2009205645 | 9/2009 |
| WO | 2011/040390 | 4/2011 |

\* cited by examiner

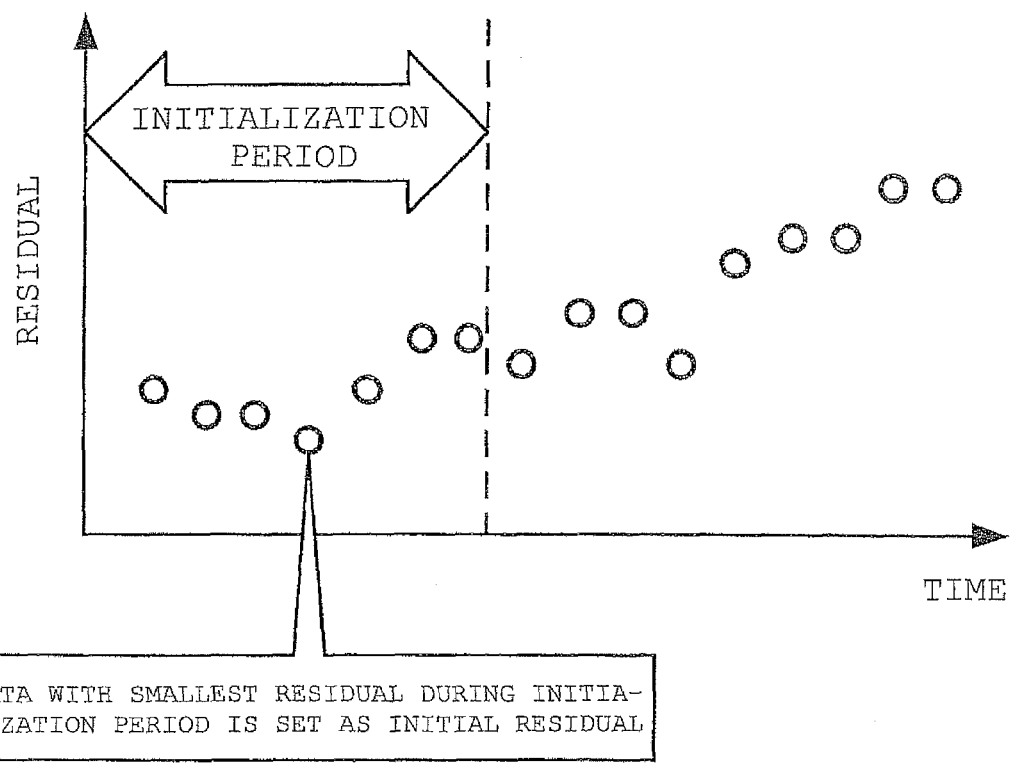

FIG. 7A

| ABSOLUTE VALUE OF SMOOTHING YAW RATE [deg/s] | ≦1 | 1~4 | 4~7 | 7< |
|---|---|---|---|---|
| ATTRIBUTE INFORMATION OF TRAVELING SCENE | STRAIGHT ROAD | GENTLY-CURVED ROAD | SHARPLY-CURVED ROAD | — |

FIG. 7B

| RESIDUAL CHANGE RATE | ER1 | ER2 | ER3 | ER4 | ER5 |
|---|---|---|---|---|---|
| AROUSAL LEVEL | AW1 | AW2 | AW3 | AW4 | AW5 |

FIG. 11

| REFERENCE MODEL ERROR | ER1 | ER2 | ER3 | ER4 | ER5 |
|---|---|---|---|---|---|
| AROUSAL LEVEL | AW1 | AW2 | AW3 | AW4 | AW5 |

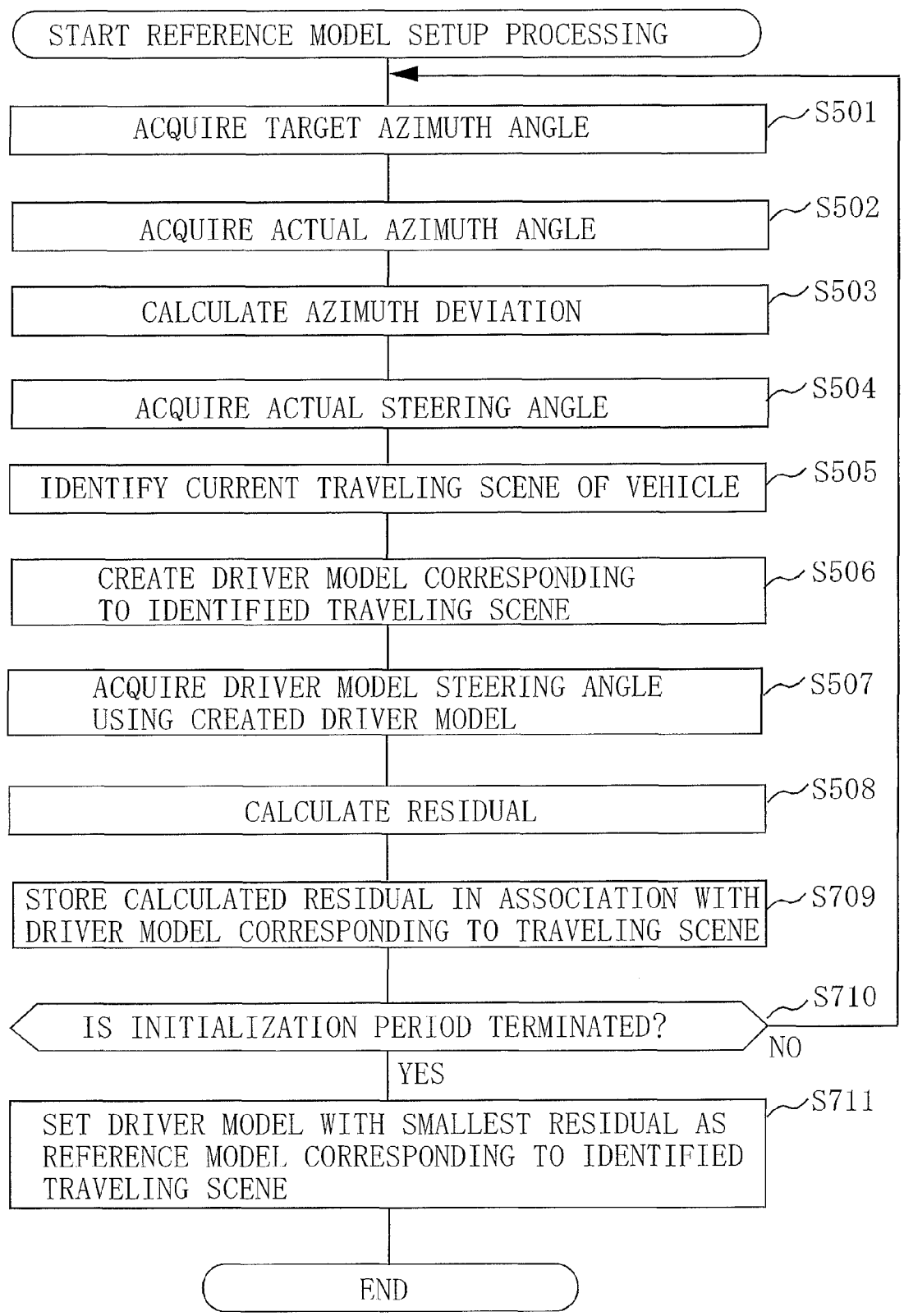

FIG. 14

| ATTRIBUTE INFORMATION OF TRAVELING SCENE | STRAIGHT ROAD | GENTLY-CURVED ROAD | SHARPLY-CURVED ROAD |
|---|---|---|---|
| CORRESPONDING REFERENCE MODEL | IM1 | IM2 | IM3 |

SYSTEM FOR ALARMING A DRIVER USING A DRIVER STATE ESTIMATION DEVICE

TECHNICAL FIELD

The present invention relates to a driver state estimation device for estimating a state of a driver who is driving a vehicle such as an automobile.

BACKGROUND OF THE INVENTION

With the purpose of causing vehicles such as automobiles to properly operate, arousal level estimation devices for estimating an arousal level of a driver who is driving a vehicle have been conventionally developed.

The applicant of the present invention has proposed the technology that estimates a driver's arousal level by using the concept of a driver model in which driver's consciousness, determination, and operation are modeled (see, Patent document 1).

According to the arousal level estimation technology of Patent document 1, a driver model creation unit creates a driver model expressing a relationship between a virtual driver's input and a virtual driver's output by using a difference between a target azimuth angle and an actual azimuth angle (an azimuth deviation) as the virtual driver's input and an actual steering angle as the virtual driver's output. Then, a driver model operation amount acquisition unit acquires a driver model steering angle by inputting a current azimuth deviation into the driver model. An arousal level estimation unit estimates an arousal level of the driver based on a difference between the actual steering angle and the driver model steering angle.

The difference between the actual steering angle and the driver model steering angle is an effective index to evaluate whether or not an operation based on driver's determination (an actual steering angle) is based on a linear model (a driver model steering angle). Also, it has been known that when the operation based on the driver's determination (the actual steering angle) differs from the driver model steering angle, it is highly probable that the driver's arousal level is decreased. Accordingly, the arousal level estimation technology of Patent document 1 can estimate the driver's arousal level based on the difference between the actual steering angle and the driver model steering angle.

PRIOR ART PATENT DOCUMENT

Patent Document

[Patent Document 1] WO2011/040390

SUMMARY OF THE INVENTION

Problems to be Solved by the Invention

Meanwhile, in the estimation technology relating to a state of the driver including a driver's arousal level, a residual to be basic data for estimating a driver's arousal level is computed using the driver model. The obtained residual is compared in magnitude with a predetermined determination threshold to obtain a relationship therebetween, so that a state of the driver is estimated.

However, the variation range of the residual to be the basic data for the arousal level estimation tends to vary depending on drivers' ages, genders, personalities, or driving characteristics specific to individual drivers, such as driving proficiency (e.g., if a driver frequently makes a quick steering operation or mainly makes a gentle steering operation).

As described above, since the estimation technology of Patent document 1 which relates to the state of the driver including a driver's arousal level uses a uniform determination threshold without considering any driving characteristics specific to individual drivers at all, there is a problem that an estimation accuracy cannot be improved.

The present invention has been made with a view to the foregoing circumstance. Accordingly, an object of the invention is to provide a driver state estimation device that can improve an accuracy of estimating a state of the driver including a driver's arousal level.

Means for Solving the Problems

For the purpose of solving the above-mentioned problems, a first aspect of the present invention provides a driver state estimation device for estimating a state of a driver driving a vehicle, including: an operation target value acquisition unit configured to acquire an operation target value of the driver; an actual movement amount acquisition unit configured to acquire an actual amount of movement of the vehicle; an actual operation amount acquisition unit configured to acquire an actual amount of operation of the driver; a driver model creation unit configured to create a driver model defining a relationship between a driver's input and a driver's output by using a difference between the operation target value and the actual amount of movement as the driver's input and the actual amount of operation as the driver's output; a driver model operation amount acquisition unit configured to acquire a driver model operation amount by inputting the difference between the operation target value and the actual amount of movement into the driver model; a residual calculation unit configured to calculate a reference model error which is obtained from a difference between the actual amount of operation and the driver model operation amount; an initial residual setup unit configured to set a residual to be a reference of the driver as an initial residual among residuals calculated by the residual calculation unit during an initialization period from timing of staring an operation of the vehicle as a starting point till a predetermined period of time elapses or from timing of a change in a traveling scene including a condition of a traveling road of the vehicle as a starting point till a predetermined period of time elapses; and a driver state estimation unit configured to estimate a state of the driver based on the residual calculated by the residual calculation unit, in which the driver state estimation unit estimates the state of the driver based on a result of comparing the initial residual set by the initial residual setup unit with the residual calculated by the residual calculation unit after the initialization period has elapsed.

Also, a second aspect of the present invention provides a driver state estimation device for estimating a state of a driver driving a vehicle, including: an operation target value acquisition unit configured to acquire an operation target value of the driver; an actual movement amount acquisition unit configured to acquire an actual amount of movement of the vehicle; an actual operation amount acquisition unit configured to acquire an actual amount of operation of the driver; a reference model setup unit configured to set as a reference model a driver model to be a reference suitable for repeated use, the driver model defining a relationship between a driver's input and a driver's output by using a difference between the operation target value and the actual amount of movement as the driver's input and the actual amount of operation as the driver's output; a reference model operation amount acquisition unit configured to acquire a reference model operation amount by inputting the difference between the operation target value and the actual amount of movement into the reference model; and a driver state estimation unit configured to estimate a state of the driver based on a reference model error which is obtained from the difference between the actual amount of operation and the reference model operation amount.

Moreover, a third aspect of the present invention provides the driver state estimation device according to the second aspect of the present invention, further including a traveling scene identification unit configured to identify a current traveling scene of the vehicle among a plurality of traveling scenes which are predetermined as traveling environments including conditions of traveling roads of the vehicle based on at least one of the actual amount of movement of the vehicle and the actual amount of operation of the driver, in which the reference model setup unit has the reference model set in association with each of the plurality of traveling scenes, and the reference model operation amount acquisition unit acquires a reference model operation amount by acquiring the reference model corresponding to the current traveling scene of the vehicle which is identified by the traveling scene identification unit from the reference model setup unit, and then inputting a difference between the operation target value and the actual amount of movement into the acquired reference model.

Effects of the Invention

According to the driver state estimation device of the present invention, an accuracy of estimating a state of the driver including a driver's arousal level can be improved.

The problems, configurations, and advantageous effects are apparent from the following embodiments for carrying out the invention.

BRIEF DESCRIPTION OF THE DRAWINGS

FIG. 5 is an illustration of a procedure to selectively set an initial residual of residuals during an initialization period.

FIG. 7A is a table showing a correlation between an absolute value of a smoothing yaw rate and attribute information of traveling scenes.

FIG. 7B is a table showing a relationship between an arousal level and a residual change rate in association with each other;

FIG. 11 is a table showing a relationship between an arousal level and a reference model error in association with each other.

FIG. 13A is a flowchart showing a flow of reference model setup processing of an operation of the third arousal level estimation device (the driver state estimation device) according to the third embodiment of the present invention.

FIG. 14 is a table showing a relationship between attribute information of a traveling scene and a corresponding reference model.

DETAILED DESCRIPTION OF THE EMBODIMENTS

Figure 1:
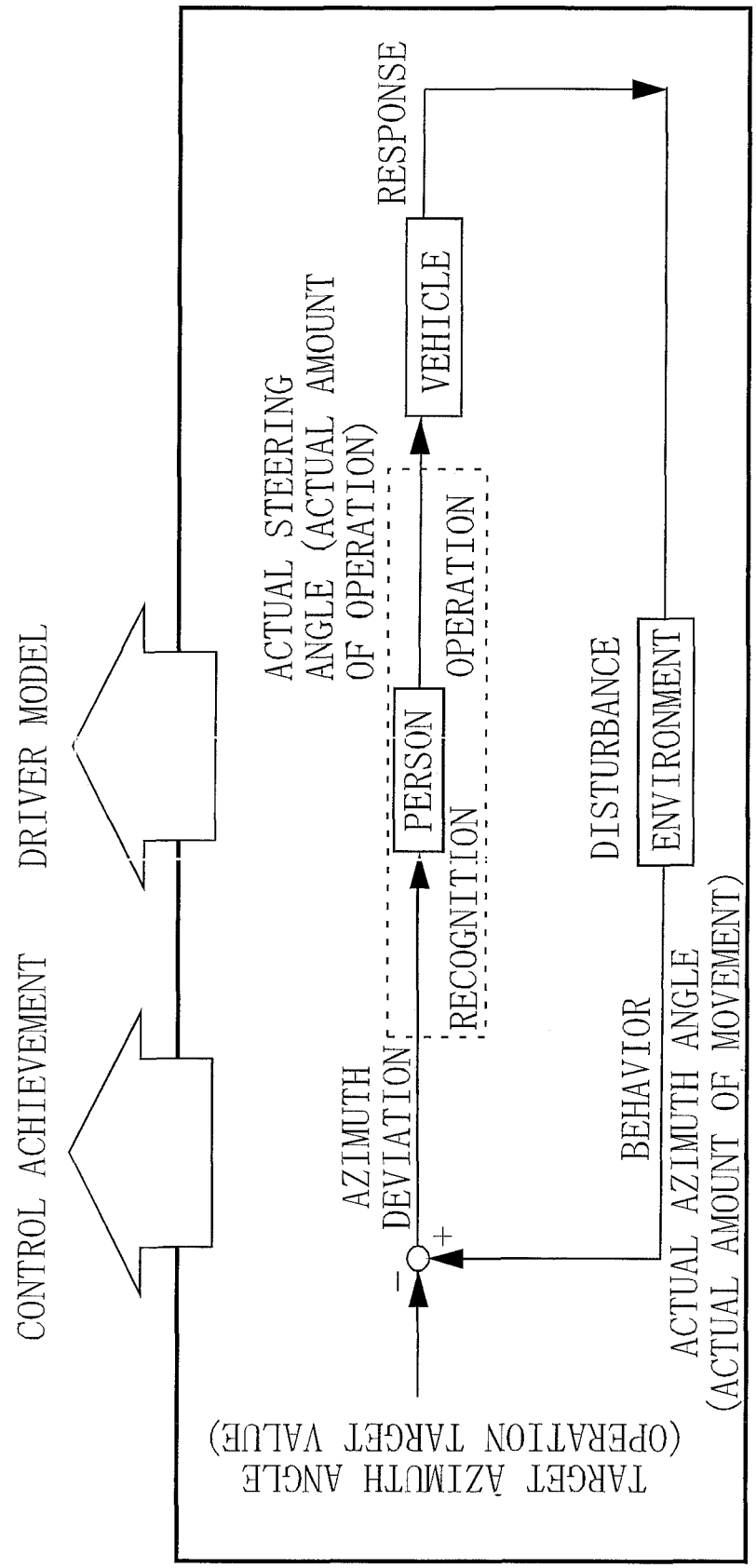
FIG. 1 is a conceptual diagram for illustrating principles relating to an arousal level estimation technology serving as the basis for the present invention.

First to third driver state estimation devices according to first to third embodiments of the present invention are described below in detail by referring to appropriate drawings.

In the first to third driver state estimation devices of the present invention, a state of a driver to be estimated is a concept comprehensively including a state of the driver including an arousal level showing a level relating to a driver's arousal level and a level relating to attentiveness or concentration which is demonstrated by a driver.

For example, as described later, if a driver drives a vehicle while asleep or after drinking, the driver's arousal level which is an aspect of the state of the driver can be estimated based on a behavior of the vehicle at that time.

With reference to the first to third driver state estimation devices according to the first to third embodiments of the present invention, the concept of a reference model to be described later is used to illustrate an arousal level estimation device for estimating a driver's arousal level.

It should be noted that same reference numerals are used in principle to denote members having same functions or members having mutually corresponding functions. Also, the duplicated description of the members having the same reference numerals is omitted in principle.

[Description of the Principles Relating to the Arousal Level Estimation Technology Serving as the Basis for the Present Invention]

Figure 2:
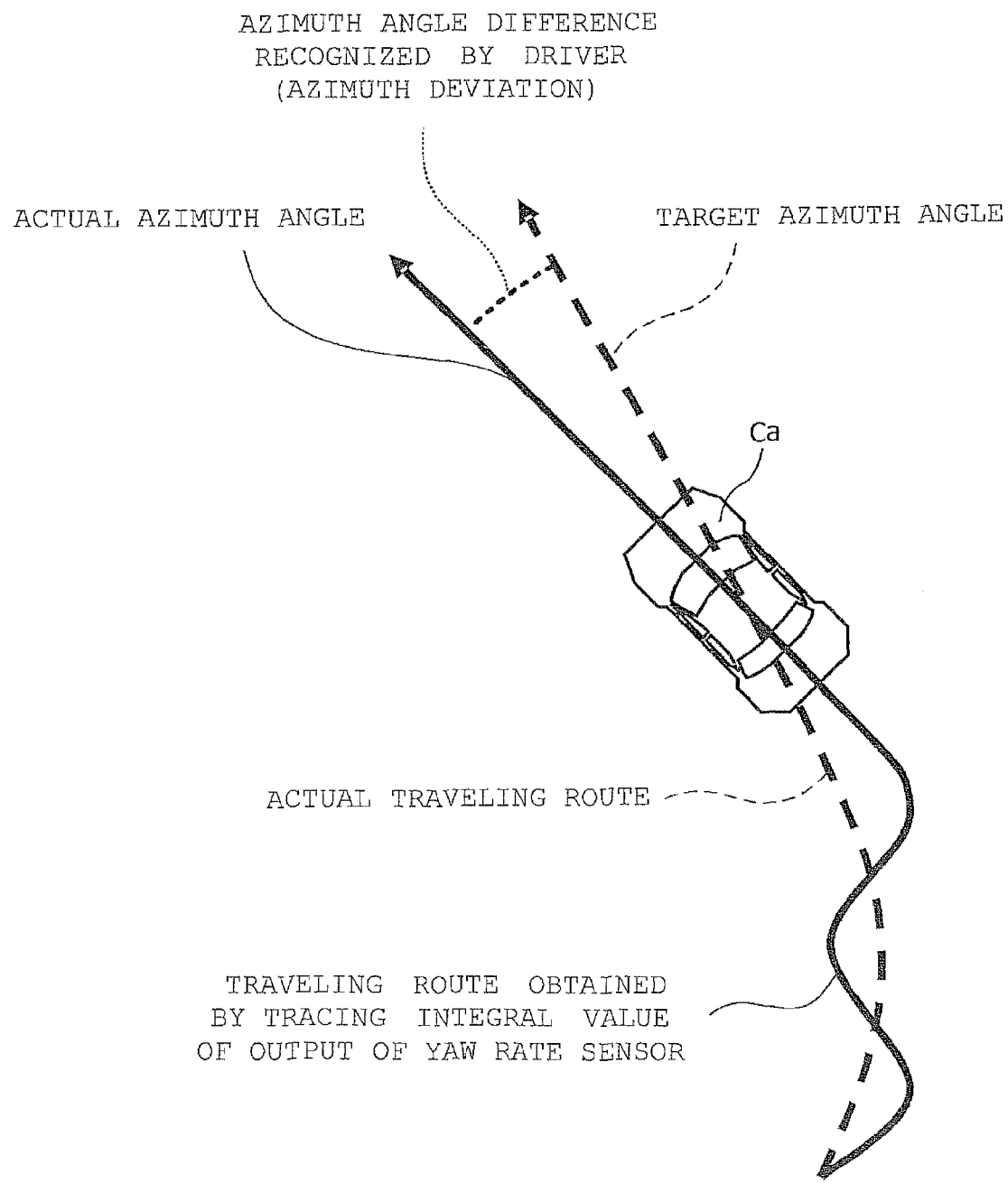
FIG. 2 is a conceptual diagram for illustrating the principles relating to the arousal level estimation technology serving as the basis for the present invention.
Figure 3:
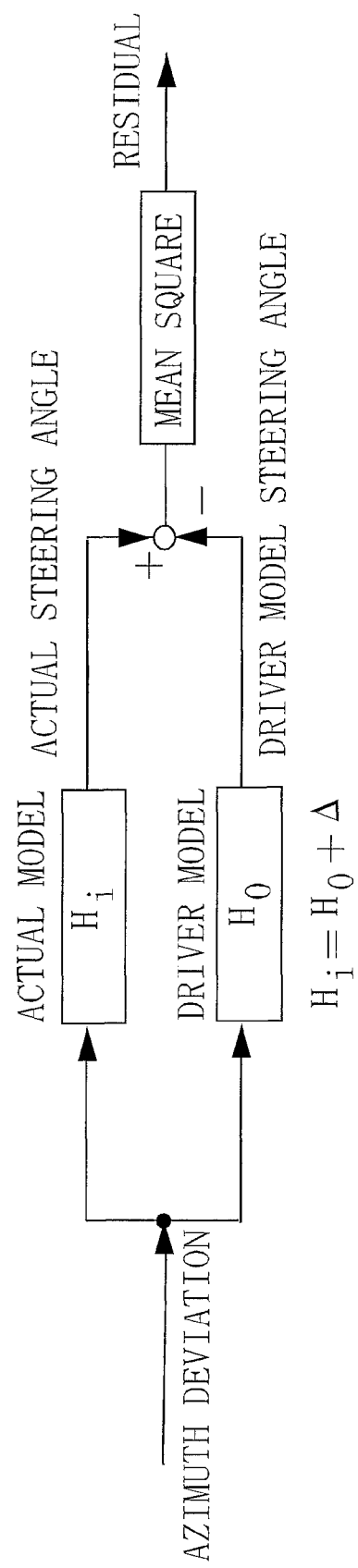
FIG. 3 is a diagram for illustrating an operation of the arousal level estimation technology serving as the basis for the present invention.

First of all, the principles relating to the arousal level estimation technology serving as a basis in the first to third embodiments of the present invention are described by referring to FIGS. 1 and 2. FIGS. 1 and 2 are conceptual diagrams, each illustrating the principles relating to the arousal level estimation technology serving as the basis for the present invention. FIG. 3 is a drawing for illustrating an operation of the arousal level estimation technology serving as the basis for the present invention.

It should be noted that, as described above, the arousal level is an aspect of the state of the driver. Accordingly, by replacing "an arousal level estimation technology" to be described below with "a driver state estimation technology," the arousal level estimation technology can be applied to the usage of estimating a state of the driver without making any change.

For example, assumed in the example of FIG. 1 is a case where a driver operates a steering wheel and controls an azimuth angle of a vehicle Ca (see FIG. 2) so as to cause the vehicle Ca to travel along signs painted on the center or sides of a road in the width direction (hereinafter, referred to as "a driving lane").

As shown in FIGS. 1 and 2, a driver recognizes an azimuth deviation between a target azimuth angle for causing a moving direction of the vehicle Ca to follow the drawing direction of the driving lane and an actual azimuth angle of the vehicle through eyesight. Based on the own driving technique (driving skills), the driver determines how much and in which direction the steering wheel has to be operated and operates the steering wheel according to the determination result. Then, the actual steering angle is generated in the steering wheel, and the vehicle Ca responds to the operation, so that a change is caused in the azimuth angle. The behavior of the vehicle Ca at that time is affected by environmental factors (disturbance) such as a friction coefficient and gradient of a traveling road surface or a traveling speed and load capacity of the vehicle Ca. As a result, the vehicle Ca causes a certain azimuth angle.

At the time point when the series of the procedures has been carried out, the actual azimuth angle often differs from the actual azimuth angle just before the series of the procedures are carried out. Similarly, the target azimuth angle often differs from the target azimuth angle just before the series of the procedures are carried out. Thus, the driver recognizes and determines an azimuth deviation, which is a deviation between the target azimuth angle and the actual azimuth angle of the vehicle through eyesight from the beginning, and operates the steering wheel according to the determination. After that, the series of the procedures as described above are repeated.

Here, for example, if the driver drives the vehicle while asleep or after drinking, the driver could cause errors in recognition, determination, and operation. Thus, it becomes difficult for the driver to drive the vehicle along the driving lane of the road in an accurate manner. As a result, the azimuth deviation tends to increase. Against this, an observation on serial transition of the azimuth deviation (control achievement) allows the driver's arousal level, which is an aspect of the state of the driver, to be estimated.

However, in the above-described arousal level estimation method, the driver's arousal level is estimated without considering the environmental factors (disturbance). Accordingly, an estimation result of this method inevitably includes an error attributed to the environmental factors (disturbance).

For this reason, the inventors of the present invention invents the technology that estimates a driver's arousal level using the concept which is referred to as a driver model (see, FIG. 1) in which driver's recognition, determination, and operation are modeled in consideration of environmental factors (disturbance).

In the arousal level estimation technology according to the above invention, i.e., the arousal level estimation technology serving as the basis for the present invention, a driver model defining a relationship between a virtual driver's input and a virtual driver's output is created by using a difference between a target azimuth angle and an actual azimuth angle (an azimuth deviation) as the virtual driver's input and an actual steering angle as the virtual driver's output. The driver model creased in this manner has a one-on-one input/output relationship, and can be dealt as a mathematical function. When a current azimuth deviation is inputted into the driver model, a driver model steering angle can be obtained as output of the driver model.

And now, as described above, the difference between the actual steering angle and the driver model steering angle (a residual) is an index to evaluate if the operation based on the driver's determination (the actual steering angle) is based on a linear model (the driver model steering angle). Also, it has been known that when the operation based on the driver's determination (the actual steering angle) differs from the driver model steering angle, it is highly probable that the driver's arousal level is decreased.

Accordingly, the arousal level estimation technology serving as the basis for the present invention can estimate a driver's arousal level based on the difference (the residual) between the actual steering angle and the driver model steering angle.

[Outline of a First Arousal Level Estimation Device According to a First Embodiment of the Present Invention]

And now, in the arousal level estimation technology serving as the basis for the present invention, a difference between an actual steering angle and a driver model steering angle (a residual to be basic data for estimating a driver's arousal level) is computed using the driver model. The residual obtained through the computation is compared with a predetermined determination threshold to obtain a magnitude relationship therebetween, so that a driver's arousal level is estimated.

However, the variation range of residuals to be the basic data for estimating an arousal level tends to vary depending on drivers' ages, genders, personalities, or driving characteristics specific to individual drivers, such as driving proficiency (e.g., if a driver frequently makes a quick steering operation or mainly makes a gentle steering operation).

In this case, with the arousal level estimation technology serving as the basis for the present invention, which uses a uniform determination threshold without considering any driving characteristics specific to individual drivers at all, it is difficult to improve an estimation accuracy.

For this reason, in a first arousal level estimation device according to a first embodiment of the present invention, attention has been drawn to an "initial residual" which is obtained by the driver model during an initialization period from timing of starting an operation of a vehicle as a starting point till a predetermined period of time elapses and from timing of a change in a traveling scene to be described later as a starting point till a predetermined period of time (which may be the same as or different from the previous predetermined period of time) elapses, because the initial residual well represents a driver's unique driving characteristic. The most important characteristic of the first arousal level estimation device is to improve accuracy in estimating a state of the driver including a driver's arousal level by estimating the driver's arousal level (the state of the driver) based on the result of the comparison between the "initial residual" and the "residual" which is obtained by using the driver model after the predetermined initialization period has elapsed.

According to the studies carried out by the inventors of the present invention, it has been proved that the driver's arousal level in the initialization period is higher than that in other time periods and the driver tends to show a unique driving characteristic which is a reference of the driver. The reason is presumably that a driver unlikely has drowsiness just after starting driving or at the timing when a traveling scene is changed and it is highly probable that the driver is concentrating in the driving, and thus a unique habit of the driver (the driving characteristic) tends to easily appear.

The inventors of the present invention have paid attention to that in the initialization period a driver tends to show a unique driving characteristic which is a reference of an individual driver. The inventors have thus obtained an idea that if the "residual" which is obtained by using the driver model after the initialization period has elapsed is divided by the "initial residual" which well represents a driving characteristic unique to the driver during the initialization period, an outlier (a value significantly deviate from a reference value) relating to an individual offset value (a "residual") with respect to the reference value (the "initial residual") is made appropriate, so that an estimation accuracy of a state of the driver including a driver's arousal level is improved.

For this reason, further studies have been carried out, which results in completing the following invention.

Here, "the timing of a change in a traveling scene" means timing at which an environment surrounding a traveling vehicle changes. Specifically, "the timing of a change in a traveling scene" is a concept including timing when a condition of a traveling road of a vehicle changes (e.g., if a road is straight or curved or in the case of the curved road, if a curvature is large or small), timing when a condition of a traveling road surface changes (e.g., if a road is paved or not; if a road is dried or wet; if a road is ice-covered), timing when a weather condition changes (e.g., fine weather, raining, snowing, or strong wind, or an outside temperature), or timing when the traveling road changes from an expressway to a local road.

[Block Configuration of the First Arousal Level Estimation Device 11A According to the First Embodiment of the Present Invention]

Figure 4:
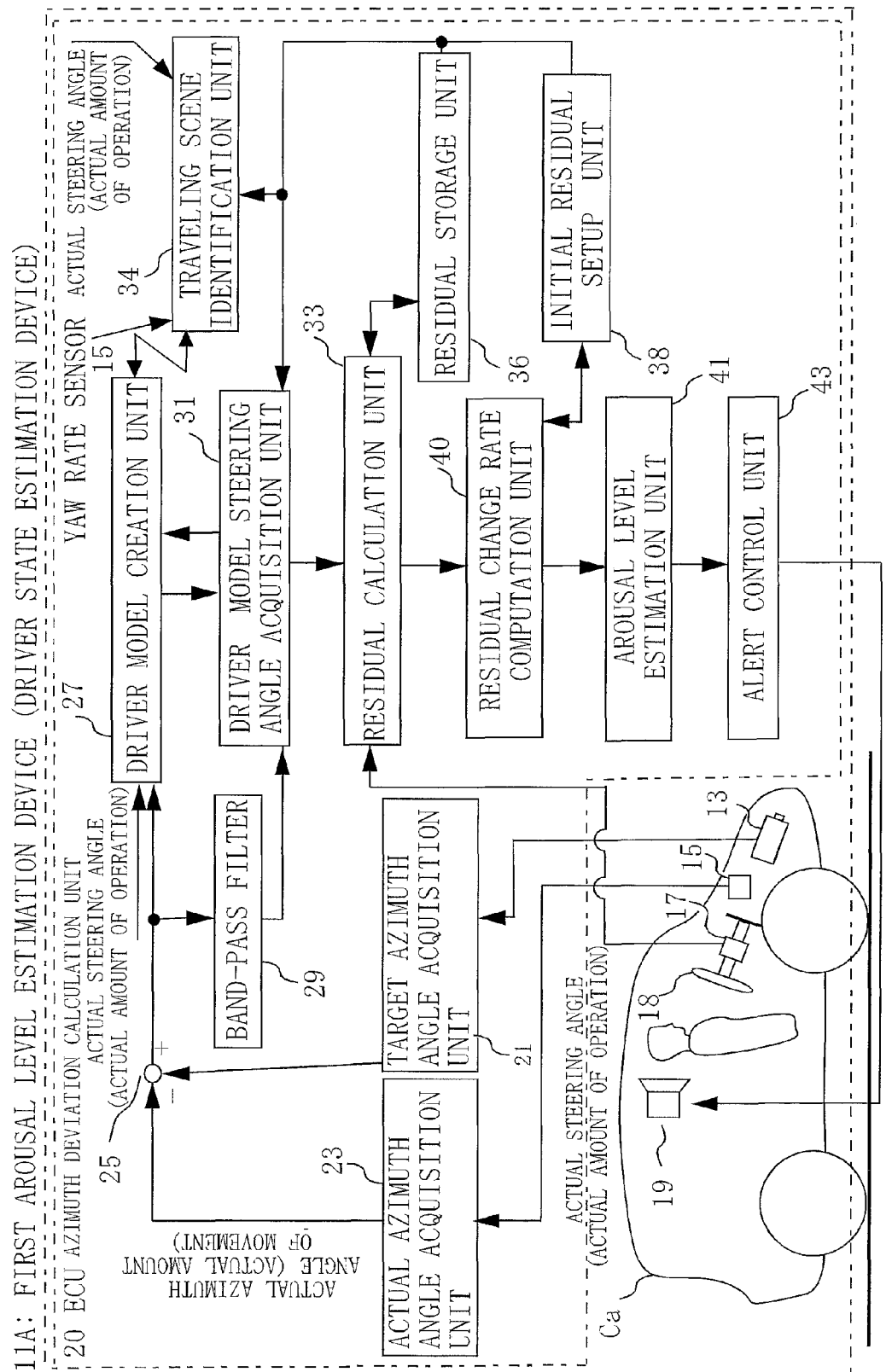
FIG. 4 is a block diagram showing a schematic configuration of a first arousal level estimation device (a driver state estimation device) according to a first embodiment of the present invention.

Hereinafter, a block configuration of a first arousal level estimation device 11A according to the first embodiment of the present invention is described by referring to FIGS. 4 and 5. FIG. 4 is a block diagram showing a schematic configuration of the first arousal level estimation device 11A according to the first embodiment of the present invention. FIG. 5 is an illustration showing a procedure to selectively set an initial residual among residuals during the initialization period.

As shown in FIG. 4, the first arousal level estimation device 11A includes an image capturing unit 13, a yaw rate sensor 15, a steering angle sensor 17, a speaker 19, and a first ECU (Electronic Control Unit) 20A. Members configuring the first arousal level estimation device 11A are mounted on the vehicle Ca. The first arousal level estimation device 11A corresponds to "the driver state estimation device" of the present invention.

The image capturing unit 13 has a function to capture an image of a road surface including a driving lane. The image capturing unit 13 includes a CCD sensor (solid state image sensor). Image information of the road including the driving lane, which is captured by the image capturing unit 13, is transmitted to a target azimuth angle acquisition unit 21 to be described later.

The yaw rate sensor 15 has a function to detect a yaw rate (a turning angle velocity around an axis in the vertical directions in the center of gravity of a vehicle) which is generated in the vehicle Ca. The yaw rate detected by the yaw rate sensor 15 is transmitted to each of an actual azimuth angle acquisition unit 23 and a traveling scene identification unit 34, which are described later.

The steering angle sensor 17 has a function to detect an actual steering angle (corresponding to "an actual amount of operation" of the present invention) of a steering wheel 18 which is operated by a driver. The steering angle sensor 17 corresponds to "the actual operation amount acquisition unit" of the present invention. The actual steering angle detected by the steering angle sensor 17 is transmitted to each of a driver model creation unit 27 and a residual calculation unit 33, which are described later.

The speaker 19 has a function to generate an alarming sound according to a control operation of an alert control unit 43 to be described later, when an arousal level estimation unit 41 to be described later obtains an estimation result indicating that the driver's arousal level is below a predetermined level. The reason is that stimulating the driver's sense of hearing is effective in order to awake the driver with the low arousal level.

The first ECU 20A includes a CPU (Central Processing Unit), a ROM (Read Only Memory), a RAM (Random Access Memory), input and output circuits (including an A/D convertor and a D/A convertor), and the like, which are not illustrated. The CPU of the first ECU 20A executes various kinds of processing including initial residual setup processing and arousal level estimation processing using the RAM as a working area according to programs stored in the ROM. The flows of these processings are described later in detail.

The first ECU 20A includes the target azimuth angle acquisition unit 21, the actual azimuth angle acquisition unit 23, an azimuth deviation calculation unit 25, the driver model creation unit 27, a band-pass filter 29, a driver model steering angle acquisition unit 31, the residual calculation unit 33, a traveling scene identification unit 34, a residual storage unit 36, an initial residual setup unit 38, a residual change rate computation unit 40, the arousal level estimation unit 41, and the alert control unit 43.

The target azimuth angle acquisition unit 21 has a function to acquire a target azimuth angle (corresponding to "an operation target value" of the present invention) of a driver. The target azimuth angle acquisition unit 21 corresponds to "an operation target value acquisition unit" of the present invention. Specifically, the target azimuth angle acquisition unit 21 performs image processing on the image information of the road including the driving lane, which has been transmitted from the image capturing unit 13, to extract the driving lane, so that the drawing direction of the driving lane is recognized. Then, the target azimuth angle acquisition unit 21 calculates and acquires a target azimuth angle based on an amount of gap between the drawing direction of the driving lane and the direction of the longitudinal axis of the vehicle in a yaw direction.

The target azimuth angle increases as the amount of gap between the drawing direction of the driving lane and the direction of the longitudinal axis of the vehicle in the yaw direction increases. Plus and minus of the target azimuth angle are set according to the direction of the gap of the longitudinal axis of the vehicle in the yaw direction with respect to the drawing direction of the driving lane. For example, it is assumed that the clockwise direction is "plus" and the anticlockwise direction is "minus."

The actual azimuth angle acquisition unit 23 has a function to acquire an actual azimuth angle (corresponding to "an actual amount of movement" of the present invention). The actual azimuth angle acquisition unit 23 corresponds to "an actual movement amount acquisition unit" of the present invention. Specifically, the actual azimuth angle acquisition unit 23 acquires an actual azimuth angle by integrating, for example, time series data of the yaw rate which is detected by and outputted from the yaw rate sensor 15, over a predetermined period of time.

The azimuth deviation calculation unit 25 has a function to calculate an azimuth deviation which is a difference between the target azimuth angle acquired by the target azimuth angle acquisition unit 21 and the actual azimuth angle acquired by the actual azimuth angle acquisition unit 23. The azimuth deviation calculated by the azimuth deviation calculation unit 25 is transmitted to each of the driver model creation unit 27 and the band-pass filter 29.

As illustrated in FIG. 4, the driver model creation unit 27 has a function to create a driver model in which a relationship between a driver's input and a driver's output is defined where the azimuth deviation is used as the driver's input and the actual steering angle is used as the driver's output.

The driver model creation unit 27 is basically configured to function when initial residual setup processing or arousal level estimation processing to be described later is performed. In other words, as similar to the arousal level estimation technology serving as the basis for the present invention, the driver model creation unit 27 adopts the configuration in which a driver model is successively created for each predetermined period of time while the vehicle Ca is traveling.

In this connection, in the present invention, a driver model defining an input-output relationship between an azimuth deviation which is the driver's input and an actual steering angle which is the driver's output is given by a first-order differential equation shown in the equation (1).

$$[\text{Driver model}] = K/(1+Ts) \quad \text{Equation (1)}$$

where K is a gain factor and Ts is a time response.

According to the definition of the driver model, a relationship in the following equation (2) is established. A solution of the first-order differential equation $[K/(1+Ts)]$ which is the driver model, is given by the following equation (3).

$$[\text{Actual steering angle}] = [K/(1+Ts)] \times [\text{Azimuth deviation}] \quad \text{Equation (2)}$$

$$[K/(1+Ts)] = [\text{Actual steering angle}]/[\text{Azimuth deviation}] \quad \text{Equation (3)}$$

Here, [Actual steering angle] on the right side of the equation (3) is detected by and outputted from the steering angle sensor 17. Also, [Azimuth deviation] on the right side of the equation (3) is calculated by the azimuth deviation calculation unit 25. In this manner, both values of the right side of the equation (3) can be acquired. Accordingly, the driver model creation unit 27 can create a driver model through calculation by adopting the equation (3).

The band-pass filter 29 has a function to allow data belonging to a frequency band of 1 to 10 rad/sec to be selectively passed among time series data including the azimuth deviation calculated by the azimuth deviation calculation unit 25 (including a frequency component over a wider band). Here, according to the studies carried out by the inventors of the present invention, it has been known that time series data including an azimuth deviation belonging to the frequency band of 1 to 10 rad/sec significantly represents a tendency of a driver with a low arousal level (e.g., when drowsiness increases). The time series data relating to the azimuth deviation which has passed through the band-pass filter 29 is transmitted to the driver model steering angle acquisition unit 31.

The driver model steering angle acquisition unit 31 has a function to acquire a driver model steering angle. The driver model steering angle acquisition unit 31 corresponds to "a driver model operation amount acquisition unit" of the present invention. Specifically, the driver model steering angle acquisition unit 31 adopts the equation (2) and acquires a driver model steering angle by multiplying the driver model $[K/(1+Ts)]$ created by the driver model creation unit 27 by the time series data relating to the azimuth deviation which has passed through the band-pass filter 29. The driver model steering angle acquired by the driver model steering angle acquisition unit 31 is transmitted to the residual calculation unit 33.

As shown in FIG. 3, the residual calculation unit 33 has a function to calculate a "residual" based on data of the actual steering angle which is transmitted from the steering angle sensor 17 and data of the driver model steering angle acquired by the driver model steering angle acquisition unit 31. Specifically, the residual calculation unit 33 calculates a "residual" to be an index indicating a driver's arousal level by obtaining a difference between the actual steering angle data and the driver model steering angle data and performing mean square processing on the obtained difference data. It should be noted that when the obtained difference data is time series data, the residual calculation unit 33 may perform the mean square processing using the time series data.

Also, the residual calculation unit 33 may perform mean square processing using the obtained difference data and difference data stored in the past. Furthermore, a mean value among several points before and after a certain time point on the time axis of the time series data or a value which is obtained by performing filtering processing to exclude a distant value which exceeds a predetermined value from the center value may be adopted as a "residual." The "residual" calculated by the residual calculation unit 33 is transmitted to each of the residual storage unit 36 and a residual change rate computation unit 40.

It should be noted that an input and an output which are related to an ideal model shown in FIG. 3 means an input and output of a steering angle which is actually made by the driver. This is because an actual driver as a party is on the opposite side of the driver model.

The traveling scene identification unit 34 has a function to identify a current traveling scene of the vehicle Ca among multiple traveling scenes which are predetermined as traveling environments including conditions of traveling roads of the vehicle Ca (specifically, e.g., if the traveling road of the vehicle Ca is straight or curved, or in the case of a carved road, a curvature is larger or small, or the like) based on at least one of the actual azimuth angle of the vehicle Ca (the actual amount of movement) and the actual steering angle (the actual amount of operation). The operation of the traveling scene identification unit 34 is described later in detail.

The residual storage unit 36 has a function to store the residual calculated by the residual calculation unit 33 during an initialization period from timing of starting an operation of the vehicle Ca as a starting point till a predetermined period of time elapses and from timing of a change in a traveling scene as a starting point till a predetermined period of time elapses. Specifically, the residual storage unit 36 stores the residual calculated by the residual calculation unit 33 during the initialization period in association with the traveling scenes identified by the traveling scene identification unit 34.

The initial residual setup unit 38 refers as needed the contents stored in the residual storage unit 36 which relate to the residual associated with the traveling scene identified by the traveling scene identification unit 34 during the initialization period.

The initial residual setup unit 38 has a function to set a residual to be a reference of the driver of the vehicle Ca as an initial residual among the residuals calculated by the residual calculation unit 33 during the initialization period. Specifically, as shown in FIG. 5, the initial residual setup unit 38 sets a residual with a smallest value as an initial residual among the residuals which are stored in the residual storage unit 36 and are associated with the traveling scenes identified by the traveling scene identification unit 34 during the initialization period.

The reason why the residual with a smallest value is set as an initial residual in the initial residual setup unit 38 is that the residual whose value is the smallest during the initialization period is obtained when the driver of the vehicle Ca operates the vehicle Ca with few mistakes which is a reference of the driver. Accordingly, the residual with the smallest value has a high correlation with the driving characteristic unique to the driver, and thus can be preferably used for acquiring the driving characteristic unique to the driver.

The initial residual set by the initial residual setup unit 38 is referred by the residual change rate computation unit 40 as needed.

The residual change rate computation unit 40 has a function to compute a change rate of a residual with respect to the initial residual. The reason why the change rate of a residual to an initial residual is computed in the residual change rate computation unit 40 is that the change rate of the residual to the initial residual is obtained by dividing the obtained residual by the initial residual, and, thus, can be preferably used to suppress the deterioration of the arousal level estimation accuracy which becomes apparent due to the outlier of the obtained residual (the value significantly deviate from the reference value).

The change rate of the residual to the initial residual which is computed by the residual change rate computation unit 40 is transmitted to the arousal level estimation unit 41.

The arousal level estimation unit 41 has a function to estimate a driver's arousal level based on the change rate of the residual to the initial residual which is computed by the residual change rate computation unit 40. The information on the arousal level estimated by the arousal level estimation unit 41 is transmitted to the alert control unit 43. The arousal level estimation unit 41 corresponds to "a driver state estimation unit" of the present invention.

The alert control unit 43 has a function to perform alert control to cause the speaker 19 to generate an alarming sound when the arousal level information indicating that the driver's arousal level is below a predetermined level is transmitted thereto from the arousal level estimation unit 41.

[Operation of the Arousal Level Estimation Device 11A According to the First Embodiment of the Present Invention]

Figure 6A:
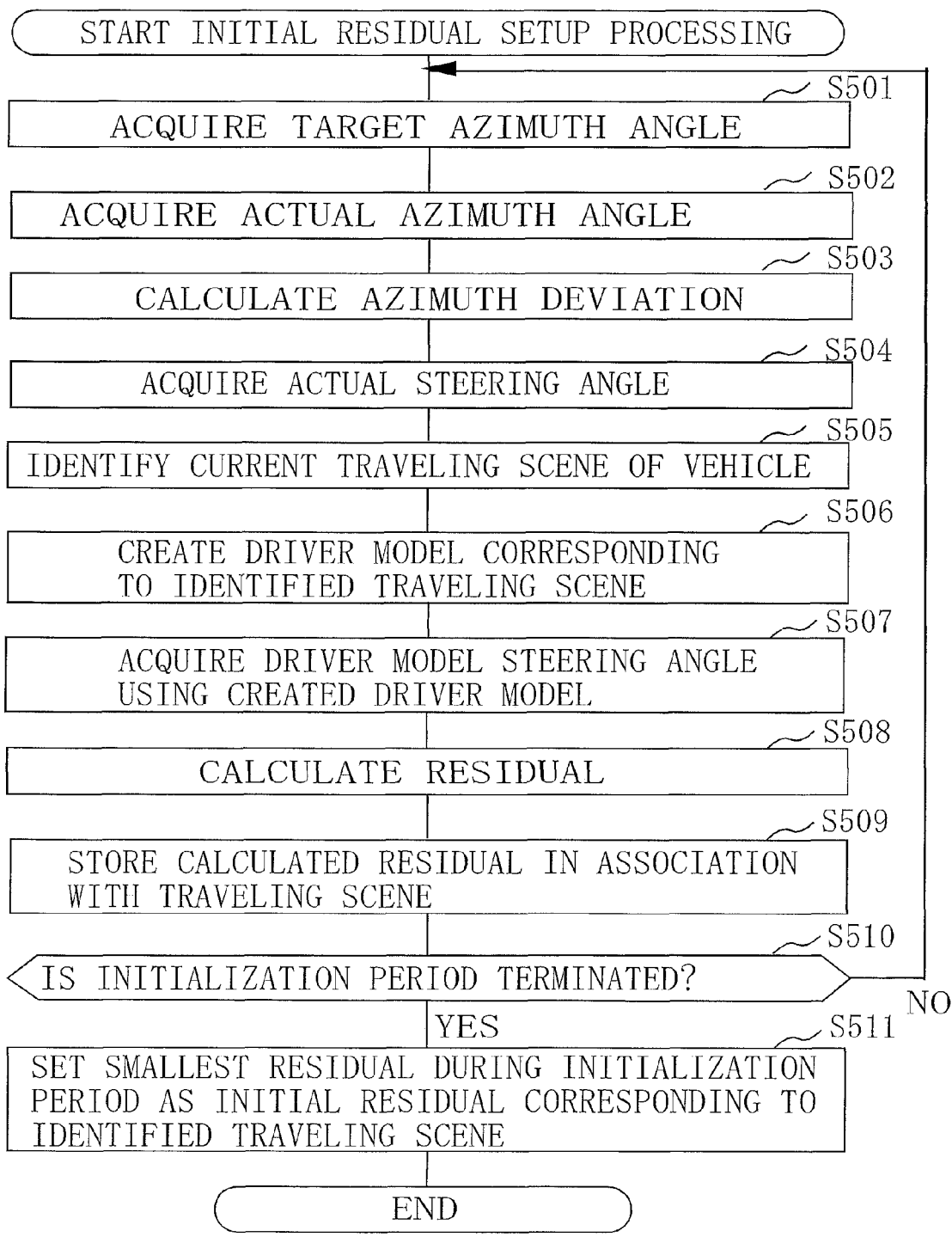
FIG. 6A is a flowchart showing a flow of initial residual setup processing of an operation of the first arousal level estimation device (the driver state estimation device).
Figure 6B:
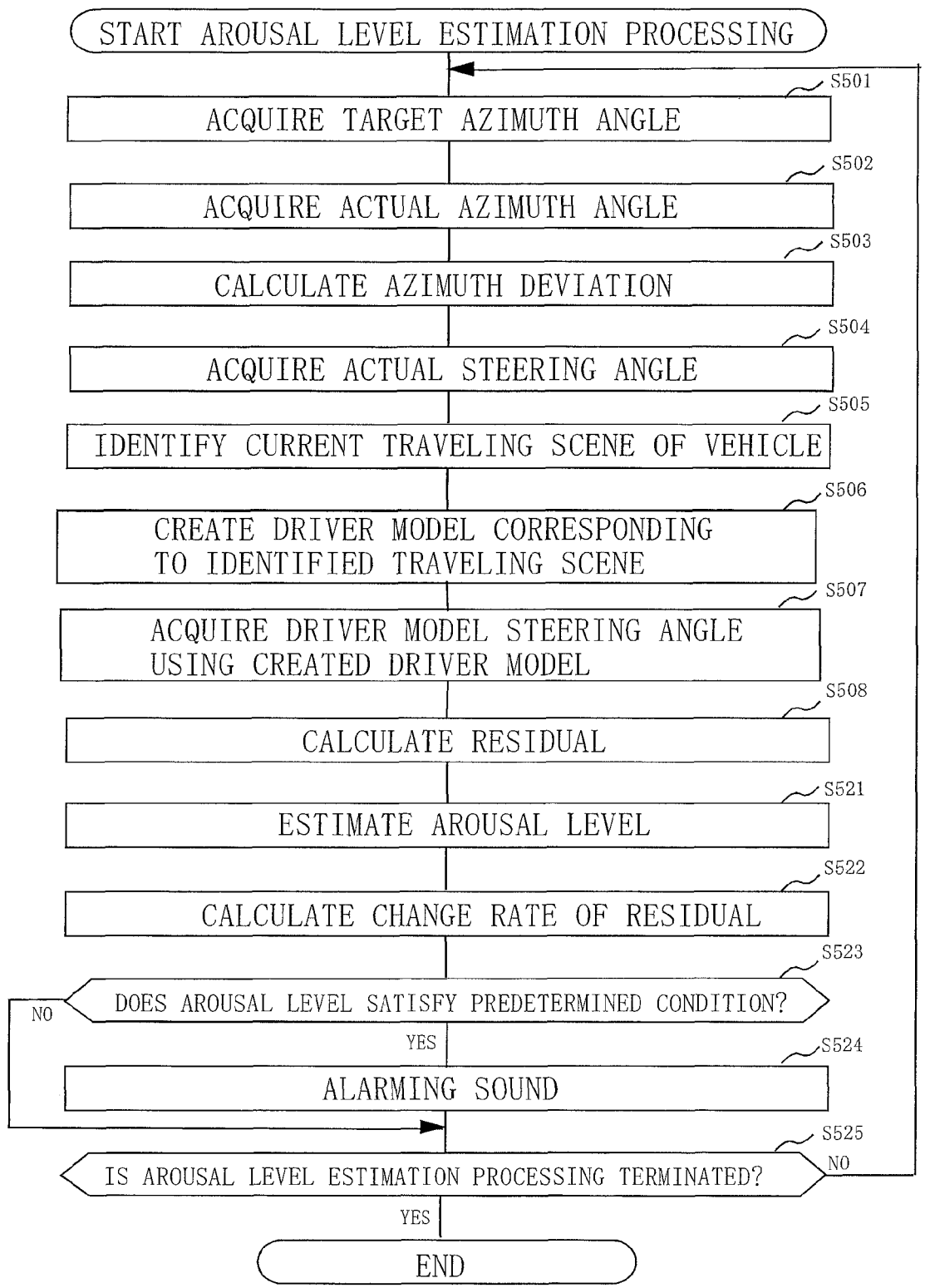
FIG. 6B is a flowchart showing a flow of arousal level estimation processing of the operation of the first arousal level estimation device (the driver state estimation device).

Hereinafter, an operation of the arousal level estimation device 11A according to the first embodiment of the present invention is described by referring to FIGS. 6A, 6B, 7A and 7B. FIG. 6A is a flowchart showing a flow of initial residual setup processing of the operation of the first arousal level estimation device 11A. FIG. 6B is a flowchart showing a flow of arousal level estimation processing of the operation of the first arousal level estimation device 11A. FIG. 7A is a table showing a correlation between an absolute value of a smoothing yaw rate and attribute information of a traveling scene. FIG. 7B is a table showing a relationship between the arousal level and the residual change rate in association with each other.

It should be noted that the initial residual setup processing shown in FIG. 6A is started at timing of starting an operation of a vehicle Ca or from timing of changing a traveling scene as a starting point under the monitoring of the first ECU 20A. Specifically, the first ECU 20A always monitors an on/off state of an unillustrated ignition switch and a state of changing a traveling scene. The first ECU 20A checks if the ignition switch is changed from an OFF state to an ON state to determine if the operation of the vehicle Ca is started. Also, the first ECU 20A checks if the traveling scene identified by the traveling scene identification unit 34 and the last traveling scene are same to determine if the traveling scene has changed.

In the example shown in FIG. 6A, data to be a basis to execute the initial residual setup processing is collected during "the initialization period" (see, step S501 to S510). Here, "the initialization period" means a period from timing of starting an operation of the vehicle Ca as a starting point till a predetermined period of time (e.g., a time whose length is suitably changeable, such as to 30 minutes) elapses or from timing of changing a traveling scene as a starting point till a predetermined period of time (e.g. a time whose length is suitably changeable, such as 10 to 30 minutes, and the predetermined time period may be the same as or different from the previous predetermined period of time) elapses.

Also, FIGS. 6A and 6B have same processing steps (see, step S501 to S508). Accordingly, the same step numbers are given to the same processing steps in FIGS. 6A and 6B, and the duplicated description thereof is omitted.

At step S501, the target azimuth angle acquisition unit 21 performs known image processing for extracting a driving lane on image information of a road surface including the driving lane, the image information having been transmitted from the image capturing unit 13, in order to extract the driving lane and recognize the drawing direction of the extracted driving lane. Then, based on an amount of difference in the yaw direction between the recognized drawing direction of the driving lane and the longitudinal axis direction of the vehicle, a target azimuth angle which is a driver's operation target value is calculated and acquired.

At step S502, the actual azimuth angle acquisition unit 23 acquires an actual azimuth angle which is an actual amount of movement of the vehicle Ca by integrating the yaw rate which is detected by the yaw rate sensor 15 over a predetermined period of time.

At step S503, the azimuth deviation calculation unit 25 calculates an azimuth deviation which is a difference between the target azimuth angle acquired at step S501 and the actual azimuth angle acquired at step S502.

At step S504, the steering angle sensor 17 detects and acquires an actual steering angle of the steering wheel 18 which is operated by the driver.

At step S505, the traveling scene identification unit performs sequential smoothing processing on the time series data relating to the actual amount of movement of the vehicle, which has been detected by the yaw rate sensor 15 and identifies a current traveling scene of the vehicle Ca based on an absolute value (data of the actual amount of movement) of the smoothing yaw rate after the smoothing processing and the attribute information of multiple traveling scenes (see, FIG. 7A).

In the example of the table shown in FIG. 7A, "a straight road" is associated as attribute information of a traveling scene with a value range belonging to a range in which the absolute value of the smoothing yaw rate is equal to or smaller than 1 [deg/s]. Also, "a curved road with a small curvature" is associated as attribute information of a traveling scene with a value range belonging to a range in which the absolute value of the smoothing yaw rate is 1 to 4 [deg/s]. And, "a curved road with a large curvature" is associated as attribute information of a traveling scene with a value range belonging to a range in which the absolute value of the smoothing yaw rate is 4 to 7 [deg/s].

Accordingly, for example, when 3 [deg/s] is detected as the absolute value of the smoothing yaw rate, the traveling scene identification unit 34 refers the table shown in FIG. 7A and identifies "the curved road with a small curvature" as the current traveling scene of the vehicle Ca, which is associated with the value range belonging to the range in which the absolute value of the smoothing yaw rate is 1 to 4 [deg/s].

In this connection, as a traveling scene corresponding to a value range belonging to a range in which the absolute value of the smoothing yaw rate exceeds 7 [deg/s], assumption may be made on a scene, for example, where the vehicle Ca travels on a zigzag road or is parking. It is probable that these special traveling scenes do not require estimation of a driver's arousal level. Accordingly, the special traveling scenes are excluded from a target of the driver's arousal level estimation.

At step S506, using the azimuth deviation calculated at step S503 as the driver's input and the actual steering angle acquired at step S504 as the driver's output, the driver model creation unit 27 creates a driver model corresponding to the traveling scene identified at step S505 through calculation by adopting the equation (3).

At step S507, the driver model steering angle acquisition unit 31 acquires a driver model steering amount by adopting the equation (2) to multiply the driver model [K/(1+Ts)] created at step S506 by the time series data relating to the azimuth deviation which has passed through the band-pass filter 29.

At step S508, the residual calculation unit 33 obtains a difference between the actual steering angle data acquired at step S504 and the driver model steering angle data acquired at step S507 and performs mean square processing on the obtained difference data, so that a "residual" to be an index showing a driver's arousal level is calculated.

At step S509, the residual storage unit 36 stores the "residual" calculated at step S508 in association with the traveling scene identified at step S505.

Here, storing the "residual" calculated at step S508 in association with the traveling scene identified at step S505 means that attribute information of the traveling scene and calculated "residual" information are stored in association with each other. The table adopting the data structure is referred to as a residual management table. The residual management table allows a "residual" whose value becomes the smallest during the initialization period to be uniquely identified.

At step S510, the first ECU 20A determines if the initialization period has terminated. This determination is made by checking if a predetermined period of time has elapsed since the initial residual setup processing started (the starting point of the "initialization period") with an unillustrated timer unit under the monitoring of the first ECU 20A.

When it is determined as a result of the determination at step S510 that the initialization period has not terminated yet ("No" at step S510), the first ECU 20A returns the flow of the processing to step S501 and performs the following processing. In this case, the initial residual setup unit 38 does not set an "initial residual."

On the other hand, when it is determined as a result of the determination at step S510 that the initialization period has terminated ("Yes" at step S510), the first ECU 20A advances the flow processing to the next step S511.

At step S511, the initial residual setup unit 38 refers to the residual management table stored in the residual storage unit 36 and extracts the "residual" whose value is the smallest during the initialization period. Then, the extracted "residual" is set as the "initial residual" corresponding to the traveling scene identified at step S505.

Here, setting the "residual" whose value is the smallest during the initialization period as the "initial residual" corresponding to the traveling scene identified at step S505 means that the attribute information of the traveling scene and the "residual" with the smallest value are associated with each other. The table adopting the data structure is referred to as an initial residual management table. The initial residual management table allows an initial residual associated with a certain traveling scene to be read as described later.

When the initial residual setup processing at step S511 has terminated, the first ECU 20A terminates the flow of the series of processing.

It should be noted that the initial residual setup processing is repeatedly performed until initial residuals respectively corresponding predetermined traveling scenes are set.

Next, the arousal level estimation processing shown in FIG. 6B is performed when, for example, a start switch (unillustrated) of the first arousal level estimation device 11A is turned on.

It should be noted that the processing steps of steps S501 to S508 are same as those of FIG. 6A. Thus, the description of the processing steps of steps S501 to S508 is omitted in FIG. 6B, and the description continues from the processing at step S521.

When the "residual" to be an index showing a driver's arousal level is calculated by the residual calculation unit 33 at step S508, the residual change rate computation unit 40 computes a change rate of the residual with respect to the initial residual in step S521.

At step S522, the arousal level estimation unit 41 estimates a driver's arousal level which is an aspect of a state of the driver based on the change rate of the residual with respect to the initial residual (the residual change rate) computed by the residual change rate computation unit 40. This estimation is performed by the following procedure.

For example, "residual change rates" are set in 5 states in the order from the smallest (ER1/ER2/ER3/ER4/ER5, see FIG. 7B). And arousal levels are set in 5 stages (AW1 (not sleepy at all)/AW2 (slightly sleepy)/AW3 (sleepy)/AW4 (very sleepy)/AW5 (extremely sleepy), see FIG. 7C) in the order from the highest arousal level (e.g., in the order of less sleepy). Then, with the above setup contents, as shown in FIG. 7B, the table in which ER1, ER2, ER3, ER4, and ER5 are respectively associated with AW1, AW2, AW3, AW4, and AW5 is prepared.

The arousal level estimation unit 41 identifies the stage among the stages of ER1 to ER5 to which the "residual change rate" calculated by the reference model error calculation unit 39 belongs. Then, the stage of the arousal level (it is assumed here that the stage is "AW4 (very sleepy)") which corresponds to the identified stage of the "residual change rate" is adopted as a driver's arousal level.

At step S523, the alert control unit 43 determines if the stage of the arousal level (AW4) which is estimated at step S522 satisfies a predetermined condition (it is assumed here that the stage of the arousal level is AW4 or AW5).

When it is determined as a result of the determination at step S523 that the stage of the arousal level which is estimated at step S522 does not satisfies the predetermined condition ("No" at step S523), the alert control unit 43 jumps the processing flow to step S525.

On the other hand, when it is determined as a result of the determination at step S523 that the stage of the arousal level which is estimated at step S522 satisfies the predetermined condition ("Yes" at step S523), the alert control unit 43 advances the processing flow to the next step S524. In the first embodiment, since the stage of the arousal level which is estimated at step S522 is "AW4 (very sleepy)" and the predetermined condition is "the stage of the arousal level is AW4 or AW5," the alert control unit 43 determines that the stage of the arousal level which is estimated at step S522 satisfies the predetermined condition and advances the processing flow to the next step S524.

At step S524, the alert control unit 43 causes the speaker 19 to generate an alarming sound. As a result, the alarming sound is continuously outputted from the speaker 19 towards the driver for a predetermined period of time (e.g., 5 seconds).

At step S24, the first ECU 20A checks if the start switch of the first arousal level estimation device 11A is turned on. When the start switch of the first arousal level estimation device 11A is turned on ("No" at step S525), the first ECU 20A returns the processing flow to step S501 and performs the following arousal level estimation processing. On the other hand, when the start switch of the first arousal level estimation device 11A is turned off ("Yes" at step S525), the first ECU 20A terminates the processing flow.

[Advantageous Effects of the First Arousal Level Estimation Device 11A According to the Present Invention]

In the first arousal level estimation device 11A according to the first embodiment of the present invention, the target azimuth angle acquisition unit 21 acquires a driver's target azimuth angle (an operation target value; hereinafter, terms of corresponding claims are denoted in brackets, and the same shall apply hereafter). The actual azimuth angle acquisition unit 23 acquires an actual azimuth angle (an actual amount of movement) of the vehicle Ca based on a value of integral of the yaw rate detected by the yaw rate sensor 15. The steering angle sensor 17 functioning as the "actual operation amount acquisition unit" of the present invention acquires an actual steering angle (an actual amount of operation) of the driver.

The driver model creation unit 27 creates a driver model in which a relationship between a driver's input and a driver's output is defined by using the azimuth deviation which is a difference between the target azimuth angle (the operation target value) and the actual azimuth angle (the actual amount of movement) as the driver's input and the actual steering angle (the actual amount of operation) as the driver's output. The driver model steering angle acquisition unit 31 inputs the azimuth deviation which is a difference between the target azimuth angle (the operation target value) and the actual azimuth angle (the actual amount of movement) into the driver model to acquire a driver model steering angle (a driver model operation amount). The residual calculation unit 33 calculates a reference model error which is obtained from a difference between the actual steering angle (the actual amount of operation) and the driver model steering angle (the driver model operation amount).

The initial residual setup unit 38 sets a residual to be a reference of the driver as an initial residual among the residuals calculated by the residual calculation unit 33 during an initialization period from timing of starting an operation of the vehicle Ca as a starting point till a predetermined period of time elapses or from timing of a change in a traveling scene including a condition of a traveling road of the vehicle Ca. The arousal level estimation unit 41 estimates a driver's arousal level which is an aspect of the state of the driver based on a result of comparing the initial residual set by the initial residual setup unit 38 after the initialization period has elapsed with the residual calculated by the residual calculation unit 33.

According to the studies carried out by the inventors of the present invention, it has been proved that the driver's arousal level is high during the initialization period as compared with that in the other periods and a unique driving characteristic to be a reference of the driver tends to appear. The reason is presumably that a driver unlikely has drowsiness just after starting driving or at the timing when a traveling scene is changed and it is highly probable that the driver is concentrating in the driving, and thus a unique habit of the driver (the driving characteristic) tends to easily appear.

For this reason, the attention has been paid to that in the first arousal level estimation device 11A, during the initialization period from timing of starting an operation of the vehicle as a starting point till the predetermined period of time elapses or from timing of a change in the traveling scene as a starting point till the predetermined period of time elapses, the "initial residual" obtained by the driver model well represents the driving characteristic unique to the driver. Accordingly, it is assumed that the driver's arousal level is estimated based on the result of the comparison between the "initial residual" and the "residual" obtained by using the driver model after the initialization period has elapsed.

Under the condition that the "residual" is a reference of the driver during the initialization period (taking the smallest value during the initialization period), the "residual" set as the "initial residual" is irrespective of whether or not it is obtained by using the driver model created by the driver model creation unit 27 which is a component of the first arousal level estimation device 11A mounted on the vehicle Ca or is created, so-called, off-line.

The first arousal level estimation device 11A can improve the estimation accuracy of the arousal level.

Also, the first arousal level estimation device 11A may adopt the configuration in which the residual storage unit 36 is further included to store the residual calculated by the residual calculation unit 33 during the initialization period and the initial residual setup unit 38 sets a residual with the smallest value as an initial residual among the residuals stored in the residual storage unit 36.

According to the studies carried out by the inventors, it has been proved that the residual with the smallest value during the initialization period is obtained when the driver of the vehicle Cs operates the vehicle Ca with few mistakes, which is a reference of the driver, and well represents the driving characteristic unique to the driver.

Since the selection criteria for the residual to be selected as an initial residual has been clearly defined, it is expected that the first arousal level estimation device 11A can further improve accuracy of arousal level estimation.

Also, the first arousal level estimation device 11A may adopt the configuration in which the residual change rate computation unit 40 is further included to compute a change rate of the residual with respect to the initial residual and the arousal level estimation unit 41 estimates the driver's arousal level based on the change rate of the residual with respect to the initial residual computed by the residual change rate computation unit 40.

According to the studies carried out by the inventors of the invention, it has been proved that when the "residual" obtained by using the driver model after the initialization period has elapsed is divided by the "initial residual" which well represents the characteristic unique to the driver during the initialization period, an outlier (a value significantly deviate from the reference value) relating to the individual offset value ("residual") with respect to the reference value (the "initial residual") is made appropriate.

It can be expected that the first arousal level estimation device 11A can further improve accuracy of the arousal level estimation.

Also, the first arousal level estimation device 11A further includes the traveling scene identification unit 34 identifying the current traveling scene of the vehicle among the multiple predetermined traveling scenes based on at least one of the actual azimuth angle (the actual amount of movement) of the vehicle Ca and the driver's actual steering angle (the actual amount of operation). The residual storage unit 36 stores the residual calculated by the residual calculation unit 33 in association with the traveling scene identified by the traveling scene identification unit 34. The initial residual setup unit 38 sets the residual with the smallest value as the initial residual among the residuals which are associated with the traveling scenes identified by the traveling scene identification unit 34 during the initialization period and are stored in the residual storage unit 36.

The first arousal level estimation device 11A can correctly identify the current traveling scene of the vehicle Ca. And, the residual storage unit 36 can store the residual and the initial residual setup unit 38 can set the "initial residual" in association with the correctly identified traveling scene. Accordingly, even in the case where the traveling scene changes from moment to moment, the estimation accuracy of the arousal level can be precisely improved.

Also, the first arousal level estimation device 11A may adopt the configuration in which the traveling scene identification unit 34 performs sequential smoothing processing on the time series data relating to at least one of the actual azimuth angle (the actual amount of movement) of the vehicle Ca and the actual steering angle (the actual amount of operation) of the driver, and identifies the current traveling scene of the vehicle Ca based on the actual movement amount data of the vehicle Ca or the actual operation amount data of the driver after the smoothing processing and attribute information of the multiple traveling scenes (e.g., if the vehicle Ca travels on a straight road or a gently curved road or a sharply curved road).

Also, the traveling scene identification unit 34 may adopt the configuration in which the sequential smoothing processing is performed on the time series data relating to the actual azimuth angle (the actual amount of movement) of the vehicle Ca detected by the yaw rate sensor 15 of the vehicle Ca and the current traveling scene of the vehicle Ca is identified based on the actual azimuth angle (the actual amount of movement) data after the smoothing processing and the attribute information of the multiple traveling scenes.

Also, the traveling scene identification unit 34 may adopt the configuration in which the current traveling scene of the vehicle Ca is identified based on the actual steering angle (the actual amount of operation) of the driver and the attribute information of the multiple traveling scenes.

The first arousal level estimation device 11A can more correctly identify the current traveling scene of the vehicle Ca. Also, the residual storage unit 36 can store the residual and the initial residual setup unit 38 can set the initial residual in association with the more-correctly identified traveling scenes. Accordingly, even in the case where the traveling scene changes from moment to moment, the arousal level estimation accuracy can be more precisely improved.

Also, the first arousal level estimation device 11A may adopt the configuration in which the target azimuth angle acquisition unit 21 acquires a target azimuth angle (an operation target value) of the driver based on traveling road information relating to the moving direction of the vehicle Ca which is obtained by capturing an image by the image capturing unit 13 or is obtained through a navigation device (unillustrated).

For example, as the navigation device, an in-vehicle navigation device is used which includes a positioning function of an autonomous navigation and a positioning function of a satellite navigation using a GPS (Global Positioning System) receiver, and has a function to detect a current position of the own vehicle through the full use of the autonomous navigation and the satellite navigation. The target azimuth angle acquisition unit 21 can acquire a driver's target azimuth angle (an operation target value) based on the traveling road information on the moving direction of the vehicle Ca which is obtained by the navigation device.

It should be noted that positioning accuracy can be increased with the positioning function of the satellite navigation using a DGPS (Differential Global Positioning System) receiver.

According to the first arousal level estimation device 11A, an acquisition route relating to the driver's operation target value is clearly defined, which bears effects of improving the estimation accuracy of the arousal level and being capable of accurately acquiring the target azimuth angle (the operation target value) of the driver.

[Outline of a Second Arousal Level Estimation Device According to a Second Embodiment of the Present Invention]

And now, the arousal level estimation technology serving as the basis for the present invention adopts steps of serial chain information processing in which a driver model is successively created for each predetermined period of period, and a residual to be basic data for estimating an arousal level is computed by using the created driver model, and, then, a driver's arousal level is estimated based on the obtained residual. Specifically, as shown in FIG. 3, operating the residual requires the actual steering angle and the driver model steering angle which is acquired by the driver model.

Accordingly, a residual has to be computed after the step of the driver model creation processing has terminated. Thus, when the arousal level estimation processing is performed, the driver model creation processing has to be added in the upstream of the critical path.

Thus, there are problems in the arousal level estimation technology serving as the basis for the present invention such that information processing is excessively loaded and the arousal level estimation processing cannot be performed at a higher speed because processing in the upstream has to be waited before processing in the downstream is executed.

For this reason, according to the studies carried out by the inventors of the present invention, it has been proved that a function which is required for the driver model is such that when an azimuth deviation is inputted, a driver model steering angle (corresponding to a "driver model operation amount" of the present invention) is outputted and, thus, even in the case where a certain driver model is repeatedly used, an arousal level estimation accuracy is not damaged so much as long as the driver model is properly set.

Accordingly, it is intended in a second arousal level estimation device according to a second embodiment of the present invention that a driver model to be a reference suitable for repeated use is set as a reference model, and the reference model is repeatedly used to reduce loads on information processing relating to successive creation of the driver model and provide an arousal estimation processing at a higher speed as a whole.

[Block Configuration of the Second Arousal Level Estimation Device 11B According to the Second Embodiment of the Present Invention]

Figure 8:
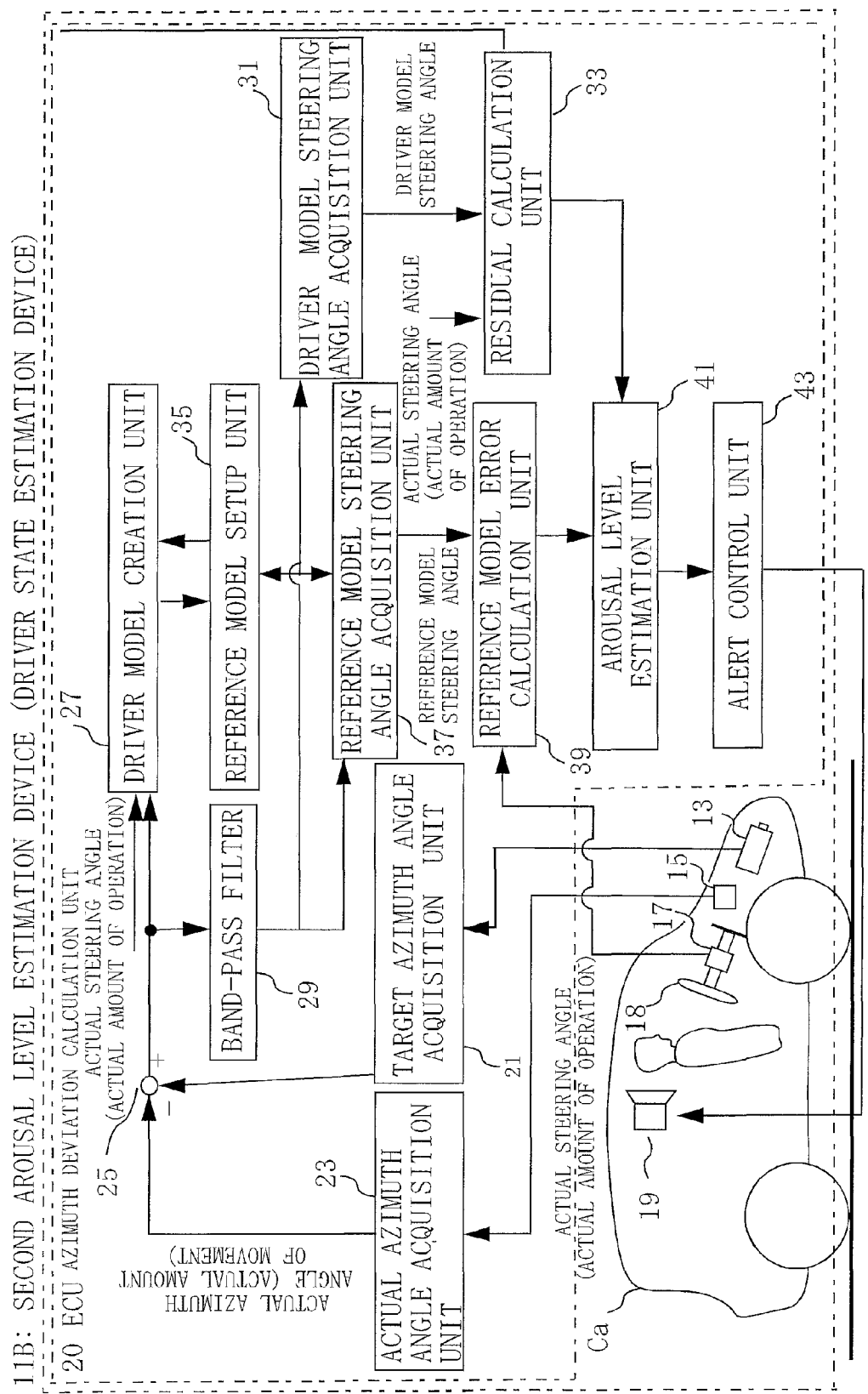
FIG. 8 is a block diagram showing a schematic configuration of a second arousal level estimation device (a driver state estimation device) according to a second embodiment of the present invention.

Hereinafter, the block configuration of the second arousal level estimation device 11B according to the second embodiment of the present invention is described by referring to FIG. 8. FIG. 8 is a block diagram showing a schematic configuration of the second arousal level estimation device 11B according to the second embodiment of the present invention.

As shown in FIG. 8, the second arousal level estimation device 11B has an image capturing unit 13, a yaw rate sensor 15, a steering angle sensor 17, a speaker 19, and a second ECU (electronic control unit) 20B. Members configuring the second arousal level estimation device 11B are mounted on a vehicle Ca. The second arousal level estimation device 11B corresponds to the "driver state estimation device" of the present invention.

The functions of the image capturing unit 13, the yaw rate sensor 15, the steering angle sensor 17, and the speaker 19 which are included in the second arousal level estimation device 11B are same as those described above. Accordingly, the duplicated description thereof is omitted. In the second arousal level estimation device 11B, the yaw rate sensor 15 corresponds to the "azimuth angle acquisition device" of the present invention.

The second ECU 20B includes a CPU (Central Processing Unit), a ROM (Read Only Memory), a RAM (Random Access Memory), input/output circuits (including an A/D converter and a D/A converter), and the like, which are not illustrated. The CPU of the second ECU 20B executes various kinds of processing including reference model setup processing and arousal level estimation processing using the RAM as a working area according to programs stored in the ROM. The flows of these processings are described later in detail.

The second ECU 20B includes a target azimuth angle acquisition unit 21, an actual azimuth angle acquisition unit 23, an azimuth deviation calculation unit 25, a driver model creation unit 27, a band-pass filter 29, a driver model steering angle acquisition unit 31, a residual calculation unit 33, a reference model setup unit 35, a reference model steering angle acquisition unit 37, a reference model error calculation unit 39, an arousal level estimation unit 41, and an alert control unit 43. Among these components, the target azimuth angle acquisition unit 21, the actual azimuth angle acquisition unit 23, the azimuth deviation calculation unit 25, the driver model creation unit 27, the band-pass filter 29, the driver model steering angle acquisition unit 31, the residual calculation unit 33, the arousal level estimation unit 41, and the alert control unit 43 are same as those of the first ECU 20A.

The second ECU 20B is different from the first ECU 20A in that a traveling scene identification unit 34, a residual storage unit 36, an initial residual setup unit 38, and a residual change rate computation unit 40 are not included and a reference model setup unit 35, a reference model steering angle acquisition unit 37, a reference model error calculation unit 39 are further included. Accordingly, differences between the first ECU 20A and the second ECU 20B are described blow, including the description of the reference model setup unit 35, the reference model steering angle acquisition unit 37, and the reference model error calculation unit 39.

In the second arousal level estimation device 11B, the driver model creation unit 27 is basically configured to function only when reference model setup processing is executed. In other words, the driver model creation unit 27 of the second arousal level estimation device 11B adopts the configuration in which a driver model, which is successively created for each predetermined period of time according to the arousal level estimation technology serving as the basis for the present invention, is created only when the reference model setup processing is executed. It is intended with this configuration that loads on the information processing relating to the successive creation of the driver model are reduced and the arousal level estimation processing is performed at a higher speed as a whole.

In the second arousal level estimation device 11B, the "residual" calculated by the residual calculation unit 33 is transmitted to the arousal level estimation unit 41.

The reference model setup unit 35 has a function to set a driver model which is a reference suitable for repeated use as a reference model among the driver models created in the past by the driver model creation unit 27. Specifically, the reference model setup unit 35 uses reference data in a range in which data is generally used as a driver's input or a driver's output to set the driver model created by the driver model creation unit 27 as a reference model. This is because the arousal level estimation processing can be broadly executed without depending on attributes of a driver to be a target of estimating an arousal level (if a driver is same as that of the driver model, or in the case where the driver is different from that of the driver model, driving skills are high or not) or variable components (disturbances) such as environments of a traveling road. The reference model set by the reference model setup unit 35 is transmitted to the reference model steering angle acquisition unit 37.

It should be noted that a reference model which is set by the reference model setup unit 35 may be a driver model other than the driver models created in the past by the driver model creation unit 27. Also, to "create a reference model" means that the driver model to be a setup target is stored in a storage such as the ROM in a state of being readable as needed in preparation for repeated use.

The reference model steering angle acquisition unit 37 has a function to acquire a reference model steering angle (corresponding to a "reference model operation amount" of the present invention). The reference model steering angle acquisition unit 37 corresponds to a "reference model operation acquisition unit" of the present invention. Specifically, the reference model steering angle acquisition unit 37 uses the above equation (2) to acquire a reference model steering angle by multiplying a driver model [K/1+Ts] set as the reference model by the reference model setup unit 35 by the time series data relating to the azimuth deviation which has passed through the band-pass filter 29. The reference model steering angle acquired by the reference model steering angle acquisition unit 37 is transmitted to the reference model error calculation unit 39.

Figure 9:
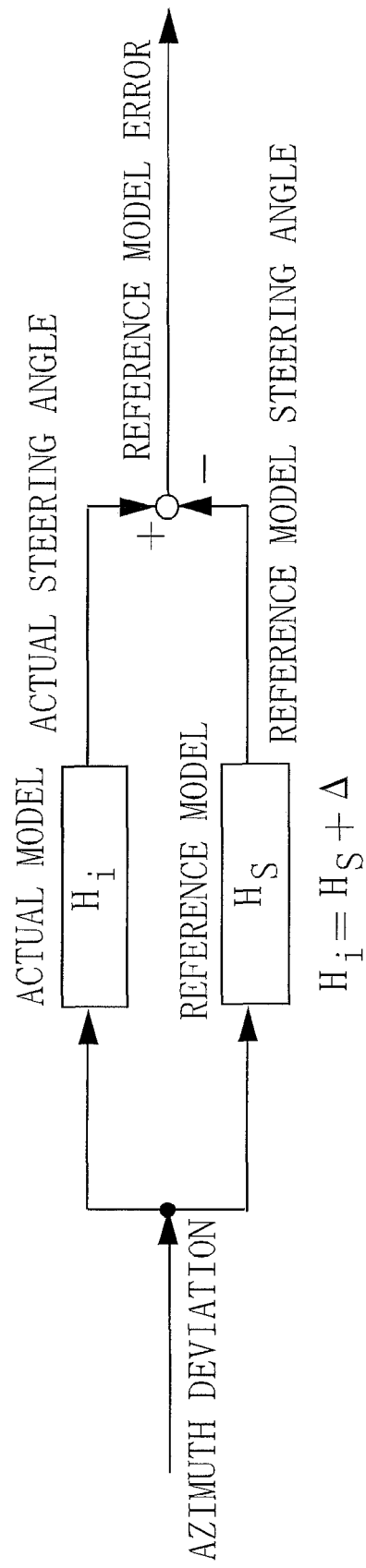
FIG. 9 is a drawing for illustrating an operation of the second arousal level estimation device (the driver state estimation device) according to the second embodiment of the invention.

As shown in FIG. 9, the reference model error calculation unit 39 has a function to calculate a "reference model error" which is an index indicating a driver's arousal level based on actual steering angle data which is transmitted from the steering angle sensor 17 and a reference model steering angle data acquired by the reference model steering angle acquisition unit 37. Specifically, the reference model error calculation unit 39 obtains a difference between the actual steering angle data and the reference model steering angle data to calculate the "reference model error." The "reference model error" calculated by the reference model error calculation unit 39 is transmitted to the arousal level estimation unit 41.

It should be noted that the reference model error calculation unit 39 may adopt the configuration in which a "reference model error" is calculated by obtaining a difference between the actual steering angle data and the reference model steering data and performing mean square processing on the obtained difference data.

In the second arousal level estimation device 11B, the arousal level estimation unit 41 has a function to estimate a driver's arousal level based on the "difference" calculated by the residual calculation unit 33 or the "reference model error" calculated by the reference model error calculation unit 39. The information on the arousal level estimated by the arousal level estimation unit 41 is transmitted to the alert control unit 43. The arousal level estimation unit 41 corresponds to the "driver state estimation unit" of the present invention.

[Operation of the Second Arousal Level Estimation Device 11B According to the Second Embodiment of the Present Invention]

Figure 10A:
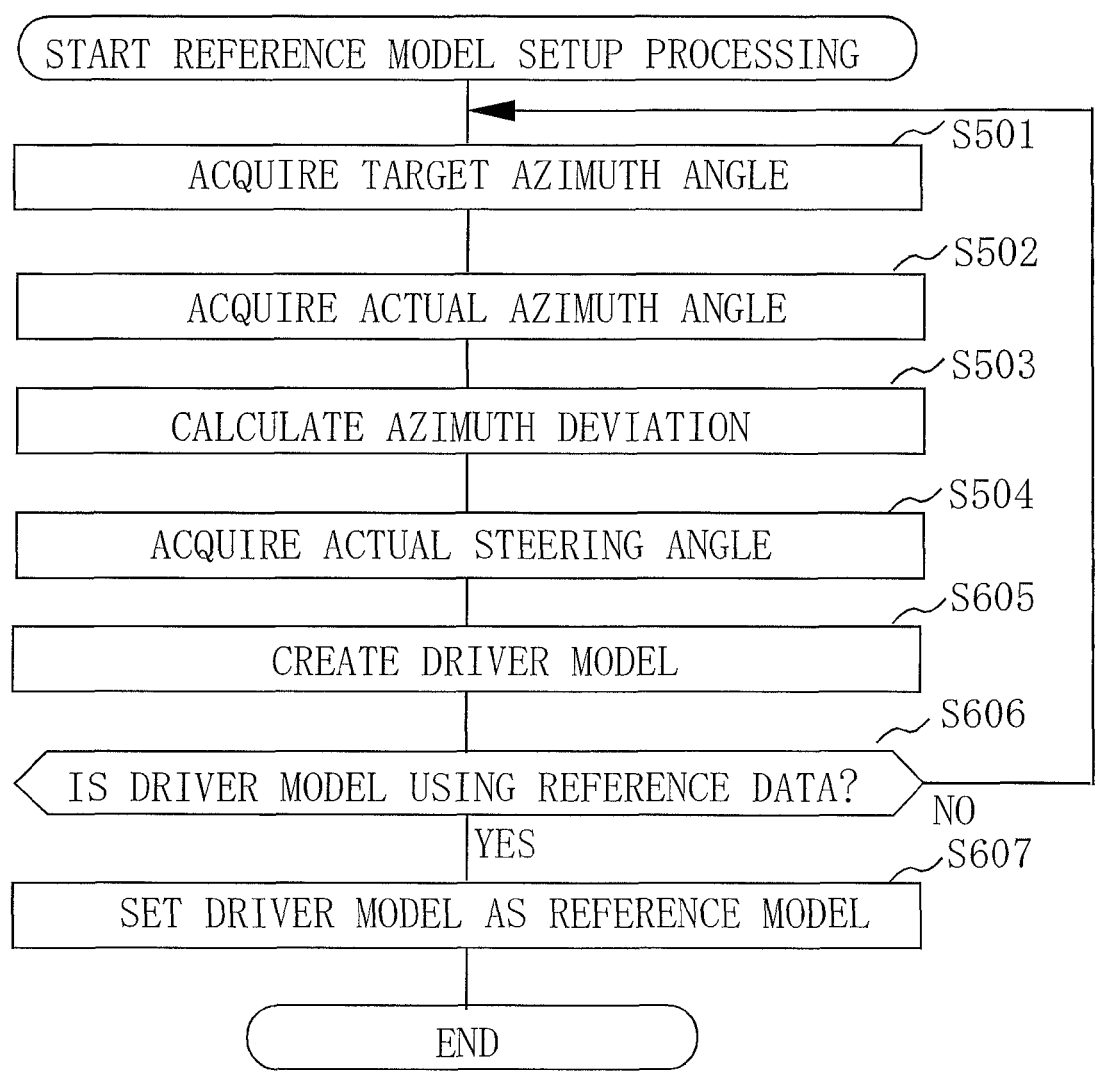
FIG. 10A is a flowchart showing a flow of reference model setup processing of an operation of the second arousal level estimation device (the driver state estimation device).
Figure 10B:
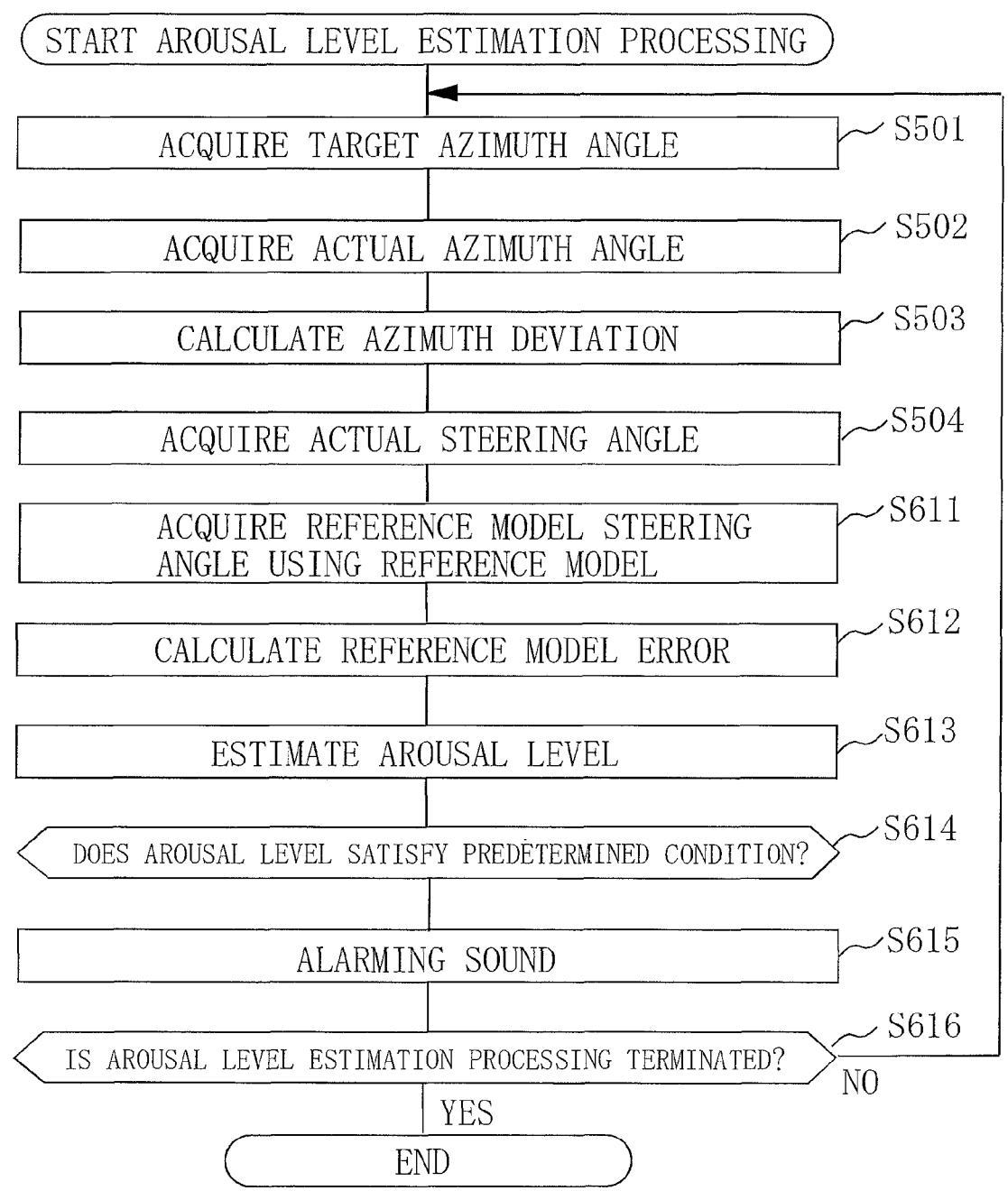
FIG. 10B is a flowchart showing a flow of arousal level estimation processing of the operation of the second arousal level estimation device (the driver state estimation device).

Hereinafter, an operation of the second arousal level estimation device 11B according to the second embodiment of the present invention is described by referring to FIGS. 10A, 10B and 11. FIG. 10A is a flowchart showing a flow of reference model setup processing of the operation of the second arousal level estimation device 11B. FIG. 10B is a flowchart showing a flow of arousal level estimation processing of the operation of the second arousal level estimation device 11B. FIG. 11 is a table showing a relationship between a reference model error and an arousal level in association with each other.

It should be noted that the reference model setup processing shown in FIG. 10A is executed, for example, in a case where a reference model is not set, or a case where even when the reference model has been already set, another reference model is redundantly set (e.g., a case where multiple drivers of a vehicle Ca exist and a unique reference model is set for each of the multiple drivers). Also, FIG. 10A includes processing steps same as those in FIG. 6A (see, steps S501 to S504). Accordingly, the same step numbers are given to the same processing steps in FIG. 10A, and the redundant description is omitted.

At step S504, when the steering angle sensor 17 acquires an actual steering angle of the steering wheel 18 which is operated by the driver, at step S605, the driver model creation unit 27 creates a driver model through calculation by using the equation (3), in which a relationship between a driver's input and a driver's output is defined by using the azimuth deviation calculated at step S503 as the driver's input and the actual steering angle acquired at step S504 as the driver's output.

At step S606, the reference model setup unit 35 determines if the driver model created at step S605 is created using the reference data. The reference data means here data in a range in which the data is generally used as a driver's input and a driver's output. Specifically, the reference data is data relating to the driver's input and the driver's output "in a state where a change amount of the actual steering angle per unit time is equal to or smaller than a predetermined value and in a case where the state has continued for a predetermined period of time."

The "in a state where a change amount of the actual steering angle per unit time is equal to or smaller than a predetermined value and in a case where the state has continued for a predetermined period of time" means here a case in which a state where the driver does not quickly operate the steering wheel 18 (a state where a change amount of the accrual steering angle per unit time is equal to or smaller than a predetermined value) has continued for a predetermined period of time. Specifically, for example, it may be assumed that a traveling scene in which a vehicle Ca keeps traveling (such as a scene in which a vehicle keeps going on a straight expressway). It is presumable that the driver model created in such a traveling scene does not have any particular tendency and has a broad utility.

In other words, in the second embodiment, the reference model setup unit 35 determines if the driver model created at step S605 is created using the reference data based on if the driver model is created in the traveling scene where a vehicle Ca is continuously traveling on a straight road.

When it is determined as a result of the determination at step S606 that the driver model created at step S605 is not created using the reference data ("No" at step S606), the reference model setup unit 35 returns the processing flow to step S501 to perform the following processing. In this case ("No" at step S606), the reference model setup unit 35 does not set the reference model.

On the other hand, when it is determined as a result of the determination at step S606 that the driver model created at step S605 is created using the reference data ("Yes" at step S606), the reference model setup unit 35 advances the processing flow to the next step S607.

At step S607, the reference model setup unit 35 sets the driver model created at step S605 as a reference model which is a driver model being a reference suitable for repeated use. When the reference model setup processing at step S607 terminates, the second ECU 20B terminates the flow of the series of processing.

Next, the arousal level estimation processing shown in FIG. 10B is executed, for example, when a start switch (unillustrated) of the second arousal level estimation device 11B is turned on.

It should be noted that the processing steps at steps S501 to S504 are same as those in FIG. 10A. Accordingly, in FIG. 10B, the description of the processing steps of steps S501 to S504 are omitted, and the contents of processing is described from step S611.

When, at step S504, the steering angle sensor 17 acquires an actual steering angle of the steering wheel 18 which is operated by the driver, at step S611, the reference model steering angle acquisition unit 37 uses the above equation (2) and acquires a reference model steering angle by multiplying the driver model [K/1+Ts] set as a reference model by the reference model setup unit 35 by the time series data relating to the azimuth deviation which has passed through the band-pass filter 29.

At step 612, the reference model error calculation unit 39 calculates a "reference model error" by obtaining a difference between the actual steering angle data acquired at step S504 and the reference model steering angle data acquired at step S611.

At step S613, the arousal level estimation unit 41 estimates a driver's arousal level which is an aspect of the state of the driver based on the "reference model error" calculated by the reference model error calculation unit 39. This estimation is performed, for example, in the following order.

In other words, "reference model errors" set in 5 states in the order from the smallest one (ER1/ER2/ER3/ER4/ER5, see FIG. 11). And arousal levels are set in 5 stages (AW1 (not sleepy at all)/AW2 (slightly sleepy)/AW3 (sleepy)/AW4 (very sleepy)/AW5 (extremely sleepy), see FIG. 11) in the order from the highest arousal level (e.g., in the order of less sleepy). Then, with the above setup contents, as shown in FIG. 11, a table in which ER1, ER2, ER3, ER4, and ER5 are respectively associated with AW1, AW2, AW3, AW4, and AW5 is prepared.

The arousal level estimation unit 41 identifies the stage among the stages of ER1 to ER5 to which the "reference model error" calculated by the reference model error calculation unit 39 belongs. Then, the stage of the arousal level (it is assumed here that the stage is "AW4 (very sleepy)") which corresponds to the identified stage of the "reference model error" is adopted as a driver's arousal level.

At step S614, the alert control unit 43 determines if the stage of the arousal level (AW4) which is estimated at step S613 satisfies a predetermined condition (it is assumed here that the stage of the arousal level is AW4 or AW5).

When it is determined as a result of the determination at step S614 that the stage of the arousal level which is estimated at step S613 does not satisfies the predetermined condition ("No" at step S614), the alert control unit 43 jumps the processing flow to step S616.

On the other hand, when it is determined as a result of the determination at step S614 that the stage of the arousal level which is estimated at step S613 satisfies the predetermined condition ("Yes" at step S614), the alert control unit 43 advances the processing flow to the next step S615. In the second embodiment, since the stage of the arousal level which is estimated at step S613 is "AW4 (very sleepy)" and the predetermined condition is "the stage of the arousal level is AW4 or AW5," the alert control unit 43 determines that the stage of the arousal level which is estimated at step S613 satisfies the predetermined condition and advances the processing flow to the next step S615.

At step S615, the alert control unit 43 causes the speaker 19 to generate an alarming sound. As a result, the alarming sound is continuously outputted from the speaker 19 towards the driver for a predetermined period of time (e.g., 5 seconds).

At step 615, the second ECU 20B checks if the start switch of the second arousal level estimation device 11B is turned on. When the start switch of the second arousal level estimation device 11B is turned on ("No" at step S616), the second ECU 20B returns the processing flow to step S501 and performs the following arousal level estimation processing. On the other hand, when the start switch of the second arousal level estimation device 11B is turned off ("Yes" at step S616), the second ECU 20B terminates the processing flow.

[Advantageous Effects of the Second Arousal Level Estimation Device 11B According to the Second Embodiment of the Present Invention]

In the second arousal level estimation device 11B according to the second embodiment of the present invention, the target azimuth angle acquisition unit 21 acquires a target azimuth angle (an operation target value) of the driver. The actual azimuth angle acquisition unit 23 acquires an actual azimuth angle (an actual amount of movement) of the vehicle Ca based on a value of integral of the yaw rate detected by the yaw rate sensor 15. The steering angle sensor 17 functioning as the "actual operation amount acquisition unit" of the present invention acquires an actual steering angle (an actual amount of operation) of the driver.

The reference model setup unit 35 sets as a reference model a driver model to be a reference suitable for repeated use, the driver model defining a relationship between a driver's input and a driver's output by using the azimuth deviation which is a difference between the target azimuth angle (the operation target value) and the actual azimuth angle (the actual amount of movement) as the driver's input and the actual steering angle (the actual amount of operation) as the driver's output. The reference model steering angle acquisition unit 37 acquires a reference model steering angle (a reference model operation amount) by inputting the azimuth deviation which is a difference between the target azimuth angle (the operation target value) and the actual azimuth angle (the actual amount of movement) into the reference model. Then, the arousal level estimation unit 41 estimates a driver's arousal level which is an aspect of the state of the driver based on the reference model error which is obtained from the difference between the actual steering angle (the actual operation amount) and the reference model steering angle (the reference model operation amount).

According to the studies carried out by the inventors of the present invention, it has been proved that it is highly probable that the function required for the driver model is a function to output a driver model steering angle (a driver model operation amount) when the azimuth deviation is inputted, and even in the case where a certain driver model is repeatedly used, the estimation accuracy of the arousal level is not damaged as long as the driver model is properly set.

Accordingly, the second arousal level estimation device 11B adopts the configuration in which the driver model to be a reference suitable for repeated use is set as a reference model and the reference model is repeatedly used.

Under the condition that the driver model to be a reference suitable for repeated use is set as a reference model, the driver model which is set as the reference model is irrespective of whether it is obtained by using the driver model created by the driver model creation unit 27 which is a component of the second arousal level estimation device 11B mounted on the vehicle Ca or is created, so-called, off-line.

The second arousal level estimation device 11B can reduce loads on information processing relating to successive creation of the driver model and provide the arousal level estimation processing at a higher speed as a whole.

The second arousal level estimation device 11B may adopt the configuration in which a driver model creation unit 27 to create a driver model is further included and the reference model setup unit 35 sets the driver model which is a reference suitable for repeated use as a reference model among the driver models created in the past by the driver model creation unit 27.

The second arousal level estimation device 11B can bear effects of reducing the loads on the information processing and providing the arousal level estimation processing at a higher speed as a whole and easily set the reference model. It is also assumed that the second arousal level estimation device 11B is used when a party of the driver model and the driver are same, so that the accuracy of the arousal level estimation is expectedly improved.

Also, the second arousal level estimation device 11B may adopt the configuration in which the reference model setup unit 35 sets the driver model created by the driver model creation unit 27 as a reference model by using the reference data in a range in which the data is generally used as a driver's input and a driver's output.

According to the second arousal level estimation device 11B, in addition to the effects of reducing the loads on the information processing and providing the arousal level estimation processing at a higher speed as a whole, the arousal level estimation processing can be broadly executed without depending on attributes of a driver to be a target of estimating an arousal level (if a driver is same as that of the driver model, or in the case where the driver is different from that of the driver model, driving skills are high or not) or variable elements (disturbances) such as environments of a traveling road.

Also, the second arousal level estimation device 11B may adopt the configuration in which the driver's input is an azimuth deviation which is a difference between the target azimuth angle and the actual azimuth angle and the driver's output is expressed by the actual steering angle of the vehicle Ca, and the reference data is data relating to the driver's input and the driver's output in a state where a change rate of the actual steering angle per unit time is equal to or smaller than a predetermined value and in a case where the state has continued for a predetermined period of time.

According to the second arousal level estimation device 11B, specific requirements for the reference data when the azimuth deviation is used as a driver's input are defined. Accordingly, effects of reducing the loads on the information processing and providing the arousal level estimation processing at a higher speed as a whole can be obtained and the reference model can be precisely set.

Also, the second arousal level estimation device 11B may adopt the configuration in which the target azimuth angle acquisition unit 21 acquires a target azimuth angle (an operation target value) of the driver based on the information on the moving direction of the vehicle Ca which is obtained by the yaw rate sensor 15 (the azimuth angle acquisition device).

Also, the second arousal level estimation device 11B may adopt the configuration in which the driver's input is a vehicle position deviation which is a difference between an actual vehicle position and a target vehicle position and the driver's output is expressed by the actual steering angle of the vehicle Ca, and the reference data is data relating to the driver's input and the driver's output in a state where a change rate of the actual steering amount per unit time is equal to or smaller than a predetermined value and in a case where the state has continued for a predetermined period of time.

According to the second arousal level estimation device 11B, the specific requirements for the reference data when the vehicle position deviation is used as a driver's input are defined. Accordingly, effects of reducing the loads on the information processing and providing the arousal level estimation at a higher speed as a whole can be obtained and the reference model can be precisely set.

Also, the second arousal level estimation device 11B may adopt the configuration in which the operation target acquisition unit 21 acquires an operation target value (a target azimuth angle/a target vehicle position) of the driver based on information on a driving lane position (information of position of a white line defining the driving lane) of the vehicle Ca which is obtained through the image capturing unit 13.

Since the second arousal level estimation device 11B adopts the configuration in which the information on the driving lane position of the vehicle Ca is used as an acquiring route relating to the operation target value of the driver, effects of reducing the loads on the information processing and the providing the arousal level estimation processing at a higher speed as a whole can be obtained and the operation target value can be precisely acquired.

Also, the second arousal level estimation device 11B can adopt the configuration in which the target azimuth angle acquisition unit 21 acquires an operation target value (a target azimuth angle/a target vehicle position) of the driver based on the road information relating to the moving direction of the vehicle Ca which is obtained from the navigation device.

Since the second arousal level estimation device 11B adopts the configuration in which the road information relating to the moving direction of the vehicle Ca which is obtained through the navigation device is used as an acquiring route relating to the operation target value, effects of reducing the loads on the information processing and providing the arousal level estimation processing at a higher speed as a whole can be obtained and the operation target value can be precisely acquired.

[Outline of a Third Arousal Level Estimation Device According to a Third Embodiment of the Present Invention]

According to the studies carried out by the inventors of the present invention, as mentioned in the description of the second arousal level estimation device according to the second embodiment of the present invention, it has been proved that a function required for the driver model is a function to output a driver model steering angle (corresponding to a "driver model operation amount" of the present invention) when an azimuth deviation is input, and even when a certain driver model is repeatedly used, an estimation accuracy is not damaged so much as long as the driver model is properly set.

Accordingly, as similar to the second arousal level estimation device according to the second embodiment of the present invention, it is intended in the third arousal level estimation device according to the third embodiment of the present invention that a driver model to be a reference suitable for repeated use is set as a reference model and the reference model is repeatedly used to reduce loads on information processing relating to successive creation of a driver model and provide an arousal level estimation processing at a higher speed as a whole.

Also, according to the studies carried out by the inventors of the present invention, it has been proved that a driver's input/output relationship in a driver model changes depending on a traveling scene of a vehicle. A specific example where the driver's input/output relationship in a driver model changes depending on a traveling scene of a vehicle is such that when a driver model steering angle in a case where the traveling scene is a straight road and a driver model steering angle in a case where the traveling scene is a curved load with a sharp curvature are compared with each other in a case where a same azimuth deviation is inputted, the driver model steering angle in the case where the traveling scene is a curved road with a sharp curvature has a tendency of becoming larger than the driver model steering angle in the case of the straight road.

For this reason, for example, when a same reference model is repeatedly and continuously used under the condition that a traveling scene of a vehicle changes from moment to moment, a case where a mismatch is caused between a vehicle's current traveling scene and a characteristic of the reference model (suitable for any of traveling scenes). This may unwillingly cause deterioration in accuracy of the arousal level estimation.

Therefore, in the third arousal level estimation device, a reference model to be a reference suitable for repeated use is set in association with predetermined multiple traveling scenes, and, then, a reference model corresponding to the current traveling scene of the vehicle is read when the vehicle is traveling, with an intention of suppressing the deterioration in the accuracy of the arousal level estimation even in the case where the traveling scene of the vehicle changes from moment to moment.

[Block Configuration of the Third Arousal Level Estimation Device 11C According to the Third Embodiment of the Present Invention]

Figure 12:
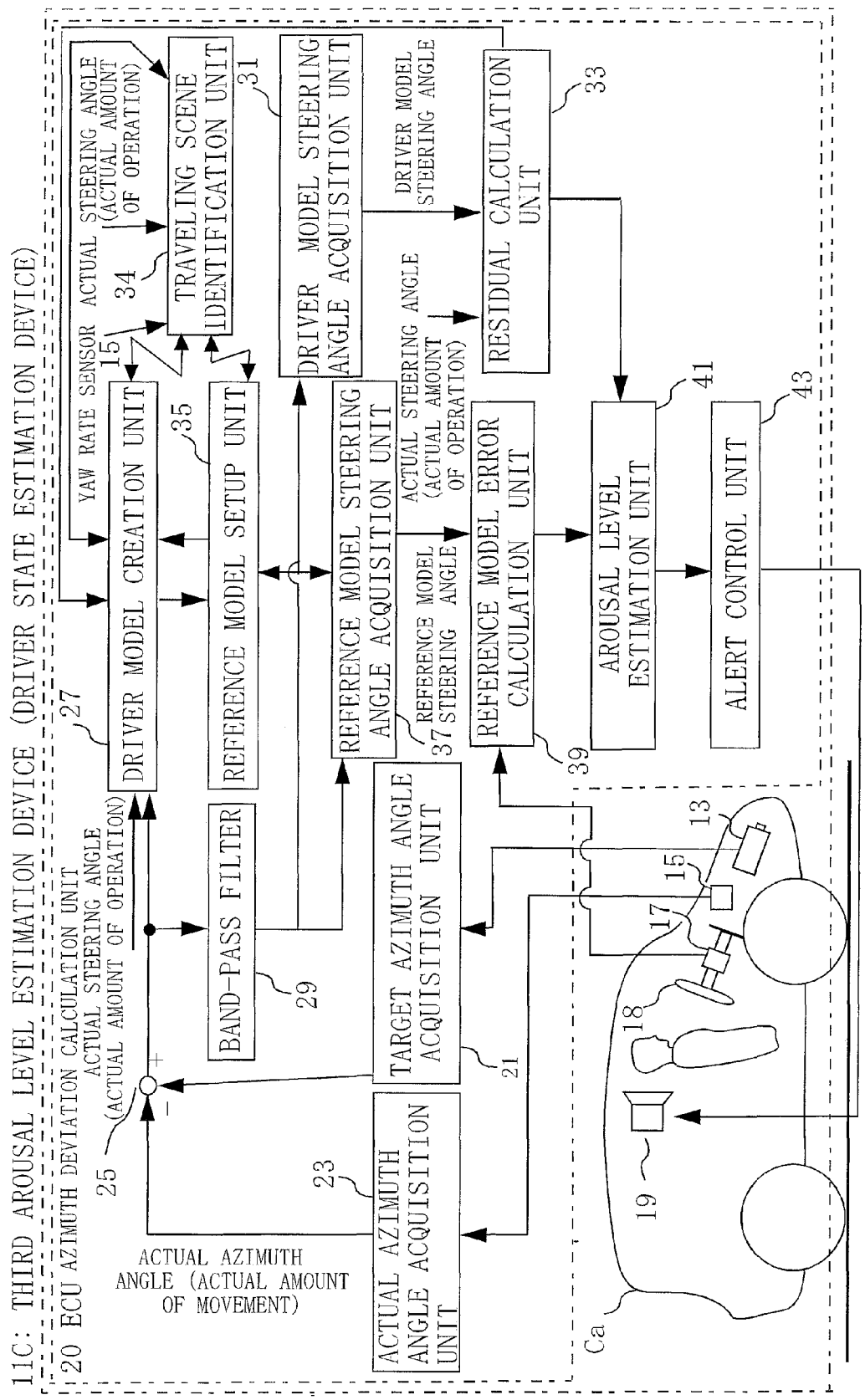
FIG. 12 is a block diagram showing a schematic configuration of a third arousal level estimation device according to a third embodiment of the present invention.

Next, the block configuration of the third arousal level estimation device 11C according to the third embodiment of the present invention is described by referring to FIGS. 12 and 5. FIG. 12 is a block diagram showing a schematic configuration of the third arousal level estimation device 11C according to the third embodiment of the present invention.

As shown in FIG. 12, the third arousal level estimation device 11C includes an image capturing unit 13, a yaw rate sensor 15, a steering angle sensor 17, a speaker 19, and a third ECU (Electronic Control Unit) 20C. Members configuring the third arousal level estimation device 11C are mounted on a vehicle Ca. The third arousal level estimation device 11C corresponds to a "driver state estimation device" of the present invention.

Functions of the image capturing unit 13, the yaw rate sensor 15, the steering angle sensor 17, and the speaker 19 of the third arousal level estimation device 11C are same as those described above. Accordingly, the duplicated description thereof is omitted.

The third ECU 20C includes a CPU (Central Processing Unit), a ROM (Read Only Memory), a RAM (Random Access Memory), input and output circuits (including an A/D converter and a D/A converter), and the like, which are not illustrated. The CPU of the third ECU 20C executes various kinds of processing including reference model setup processing and arousal level estimation processing by using the RAM as a working area according to programs which are stored in the ROM. The flows of these processings are described later in detail.

The third ECU 20C includes a target azimuth angle acquisition unit 21, an actual azimuth angle acquisition unit 23, an azimuth deviation calculation unit 25, a driver model creation unit 27, a band-pass filter 29, a driver model steering angle acquisition unit 31, a residual calculation unit 33, a traveling scene identification unit 34, a reference model setup unit 35, a reference model steering angle acquisition unit 37, a reference model error calculation unit 39, an arousal level estimation unit 41, and an alert control unit 43. Among these components, the third ECU 20C is same with the first ECU 20A in that the third ECU 20C includes the target azimuth angle acquisition unit 21, the actual azimuth angle acquisition unit 23, the azimuth deviation calculation unit 25, the driver model creation unit 27, the band-pass filter 29, the driver model steering angle acquisition unit 31, the residual calculation unit 33, the traveling scene identification unit 34, the arousal level estimation unit 41, and the alert control unit 43.

The third ECU 20C is different from the first ECU 20A in that the third ECU 20C does not include a residual storage unit 36, an initial residual setup unit 38, and a residual change rate computation unit 40 but further includes a reference model setup unit 35, a reference model steering angle acquisition unit 37, and a reference model error calculation unit 39. Then, differences between the first ECU 20A and the third ECU 20C are described below, including the description of the reference model setup unit 35, the reference model steering angle acquisition unit 37, and the reference model error calculation unit 39.

In the third arousal level estimation device 11C, as similar to the driver model creation unit 27 of the second arousal level estimation device 11B, the driver model creation unit 27 is basically configured to function only when reference model setup processing is executed. In other words, the driver model creation unit 27 of the third arousal level estimation device 11C adopts the configuration in which a driver model is created only when reference model setup processing is executed although a driver model is successively created for each predetermined period of time in the arousal level estimation technology serving as the basis for the present invention. It is intended with this configuration that loads on information processing relating to successive creation of the driver model are reduced and arousal level estimation processing is performed at a higher speed as a whole.

In the third arousal level estimation device 11C, the reference model setup unit 35 basically has a function to set a driver model to be a reference suitable for repeated use as a reference model among the driver models created in the past by the driver model creation unit 27. Specifically, the reference model setup unit 35 sets the driver model as a reference model corresponding to the traveling scene, the driver model having been used when a residual with the smallest value is obtained as the residual obtained from a difference between an actual amount of operation (an actual steering angle) and a driver model operation amount (a driver model steering angle) acquired by the driver model steering angle acquisition unit 31 during an initialization period from timing of starting an operation of the vehicle Ca as a starting point till a predetermined period of time elapses or from timing of a change in a traveling scene as a starting point till a predetermined period of time elapses. The operation of the reference model setup unit 35 is described later in detail. The reference model set by the reference model setup unit 35 is referred as needed by the traveling scene identification unit 34 and the reference model steering angle acquisition unit 37.

It should be noted that the reference model which is set by the reference model setup unit 35 may be a driver model other than the driver models created in the past by the driver model unit 27. In addition, to "set as a reference model" means that a driver model to be a setup target is stored in preparation for being repeatedly used in a storage unit such as a RAM in a state of being readable as needed by adding attribute information of traveling scenes to which the driver models respectively belongs.

[Operation of the Third Arousal Level Estimation Device 11C According to the Third Embodiment of the Present Invention]

Figure 13B:
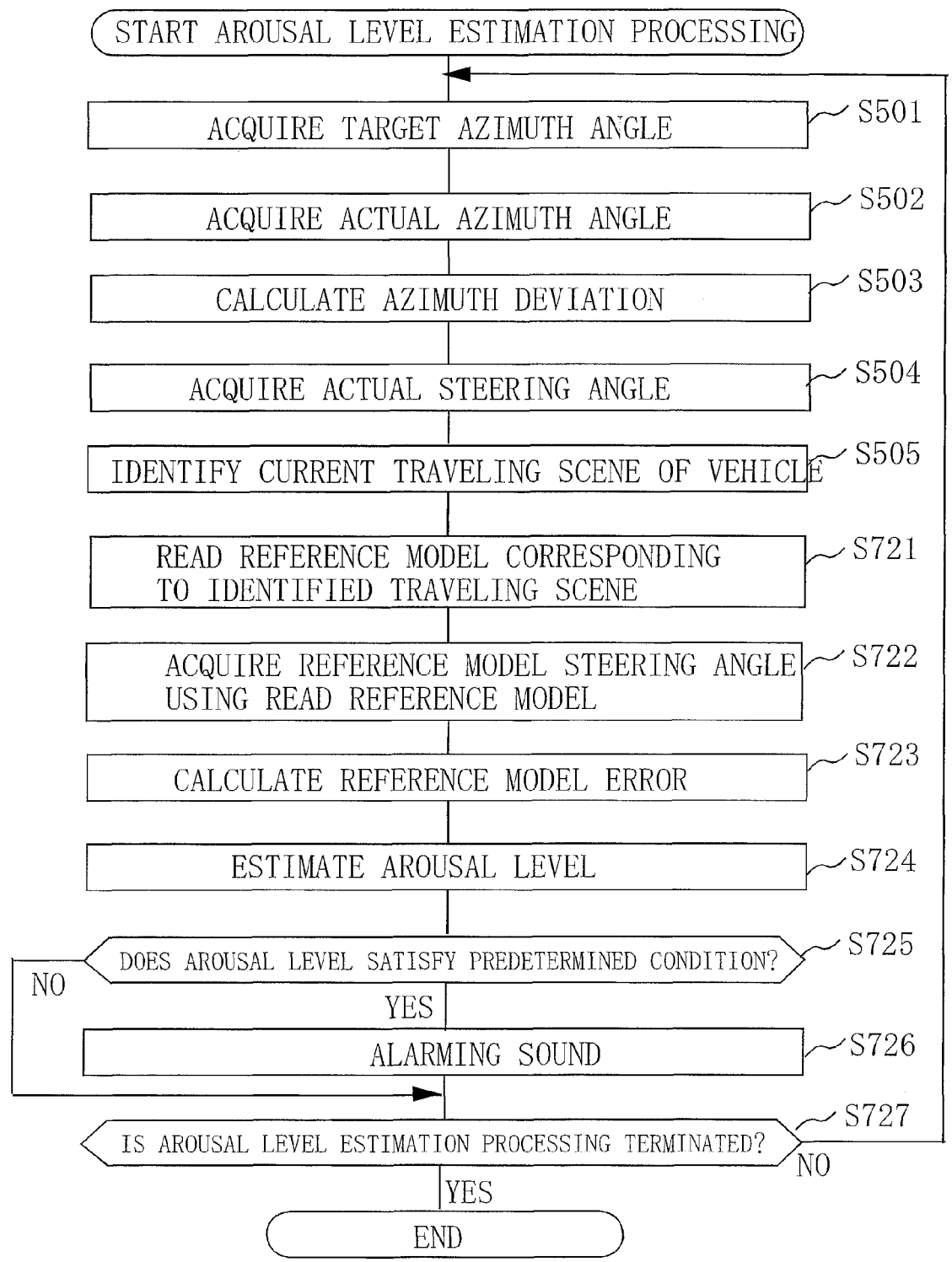
FIG. 13B is a flowchart showing a flow of arousal level estimation processing of the operation of the third arousal level estimation device (the driver state estimation device) according to the third embodiment of the present invention.

Next, an operation of the third arousal level estimation device 11C according to the third embodiment of the invention is described by referring to FIGS. 13A, 13B and 14. FIG. 13A is a flowchart showing a flow of reference model setup processing of the operation of the third arousal level estimation device 11C according to the third embodiment of the present invention. FIG. 13B is a flowchart showing a flow of arousal level estimation processing of the operation of the third arousal level estimation device 11C. FIG. 14 is an illustration showing a relationship between traveling scene attribute information and a corresponding reference model.

As similar to the initial residual setup processing shown in FIG. 6A, the reference model setup processing shown in FIG. 13A is started at timing of starting an operation of a vehicle Ca or at timing of a change in a traveling scene as a starting point under the monitoring of the third ECU 20C. In the example shown in FIG. 13A, data which is a basis for executing the reference model setup processing is collected during the "initialization period" according to the first embodiment (see, steps S501 to S508 in FIG. 6A). In other words, FIG. 13A includes the steps same as those in FIG. 6A. Thus, in FIG. 13A, same step numbers are given to denote same processing steps, and the duplicated description thereof is omitted.

When, at step S508, the residual calculation unit 33 calculates a "residual" to be an index showing a driver's arousal level, at step S709, the driver model creation unit stores the "residual" calculated at step S508 in association with a driver model corresponding to the traveling scene identified at step S505.

Storing the "residual" calculated at step S508 in association with a driver model corresponding to the traveling scene identified at step S505 means here that attribute information of traveling scenes, information on a function of the driver model (see the equation (3)), and information on the calculated "residual" are stored in association with one another. The table adopting such a data structure is referred to as a driver model management table. With the driver model management table, as described later, a driver model with the "residual" which is the smallest during the initialization period can be uniquely identified.

At step S710, the third ECU 20C determines if the initialization period has terminated. This determination is performed by checking if a predetermined period of time has elapsed since the reference model setup processing started (from the starting point of the "initialization period") with an unillustrated timer unit under the monitoring of the third ECU 20C.

When it is determined as a result of the determination at step S710 that the initialization period has not terminated yet ("No" at step S710), the third ECU 20C returns the processing flow to step S501 and executes the following processing. In this case ("No" at step S710), the reference model setup unit 35 does not set a reference model.

On the other hand, when it is determined as a result of the determination at step S710 that the initialization period has elapsed ("Yes" at step S710), the third ECU 20C advances the processing flow to the next step S711.

At step S711, the reference model setup unit 35 refers to the driver model management table stored in the driver model creation unit 27, and extracts a driver model whose "residual" is the smallest during the initialization period, and then the extracted driver model is set as a reference model corresponding to the traveling scene identified at step S505.

Setting the driver model with the smallest "residual" as a reference model corresponding to the traveling scene identified at step S505 means here that attribute information of the traveling scenes and the function information of the driver model with the smallest "residual" (see, the equation (3)) are stored in association with each other. The table adopting such a data structure is referred to as a reference model management table (see, FIG. 14). With the reference model management table shown in FIG. 14, as described later, a reference model associated with a certain traveling scene can be read.

When the reference model setup processing at step S711 has terminated, the third ECU 20C terminates the flow of the series of the processing.

It should be noted that the reference model setup processing is repeated until the setup of reference models respectively corresponding to multiple traveling scenes which are determined in advance is terminated.

Next, the arousal level estimation processing shown in FIG. 13B is executed, for example, when a start switch of the third arousal level estimation device 11C is turned on.

It should be noted that the processing steps of steps S501 to S505 are same as those of FIG. 13A. Thus, the description of the processing steps of steps S501 to S505 is omitted in FIG. 13B, and the description continues from the processing at step S721.

At step S721, the reference model setup unit 35 extracts the reference model corresponding to the traveling scene identified at step S505 by using the attribute information relating to the traveling scene as a retrieval key and reads the extracted reference model from the reference model management table shown in FIG. 14.

At step S722, the reference model steering angle acquisition unit 37 uses the reference model read at step S721 and uses the above equation (2) to acquire a reference model steering angle by multiplying the driver model [K/1+Ts] set as the reference model by the time series data relating to the azimuth deviation which has passed through the band-pass filter 29.

At step S723, the reference model calculation unit 39 calculates a "reference model error" by obtaining a difference between the actual steering angle data acquired at step S504 and the reference model angle data acquired at step S722.

At step S724, the arousal level estimation unit 41 estimates a driver's arousal level which is an aspect of the state of the driver based on the "reference model error" calculated by the reference model error calculation unit 39. This estimation is performed by using the table shown in FIG. 11. In other words, the arousal level estimation unit 41 identifies the stage of the reference model error from ER1 to ER5 on the table shown in FIG. 11 to which the "reference model error" calculated by the reference model error calculation unit 39 belongs. And the stage of the arousal level ("AW4 (very sleepy)" is assumed here) corresponding to the identified stage of the "reference model error" is used as a driver's arousal level.

At step S725, the alert control unit 43 determines if the stage (AW4) of the arousal level estimated at step S724 satisfies a predetermined condition (it is assumed here that the "stage of the arousal level is AW4 or AW5").

When it is determined as a result of the determination at step S725 that the stage of the arousal level estimated at step S724 does not satisfy the predetermined condition ("No" at step S725), the alert control unit 43 jumps the processing flow to step S727.

On the other hand, when it is determined as a result of the determination at step S725 that the stage of the arousal level estimated at step S724 satisfies the predetermined condition ("Yes" at step S725), the alert control unit 43 advances the processing flow to the next step S726. In the present embodiment, the stage of the arousal level estimated at step S724 is "AW4 (very sleepy)." Thus, since the predetermined condition is that the "stage of the arousal level is AW4 or AW5," the alert control unit 43 determines that the stage of the arousal level estimated at step S724 satisfies the predetermined condition and advances the processing flow to the next step S726.

At step S726, the alert control unit 43 causes the speaker 19 to generate an alarming sound. As a result, the alarming sound is continuously outputted from the speaker 19 towards the driver for a predetermined period of time (e.g., 5 seconds).

At step S726, the third ECU 20C checks if a start switch of the third arousal level estimation device 11C is turned on. When the start switch of the third arousal level estimation device 11C is turned on ("No" at step S727), the third ECU 20C returns the processing flow to step S501 and performs the following arousal level estimation processing. On the other hand, when the start switch of the third arousal level estimation device 11C is turned off ("Yes" at step S727), the third ECU 20C terminates the processing flow.

[Advantageous Effects of the Third Arousal Level Estimation Device 11C According to the Third Embodiment of the Present Invention]

In the third arousal level estimation device 11C according to the third embodiment of the present invention, the target azimuth angle acquisition unit 21 acquires a target azimuth angle (an operation target value) of a driver. The actual azimuth angle acquisition angle acquisition unit 23 acquires an actual azimuth angle (an actual amount of movement) of a vehicle Ca based on an integral value of the yaw rate detected by the yaw rate sensor 15. The steering angle sensor 17 functioning as the actual operation amount acquisition unit of the present invention acquires the actual steering angle (the actual amount of operation) of the driver.

The traveling scene identification unit 34 identifies a current traveling scene of the vehicle Ca among the multiple traveling scenes predetermined as the traveling environment including the conditions of the traveling road of the vehicle Ca based on at least one of the actual azimuth angle (the actual amount of movement) of the vehicle Ca and the actual steering angle (the actual amount of operation) of the driver. The reference model setup unit 35 sets a driver model as a reference model, which is a driver model defining a relationship between a driver's input and a driver's output where an azimuth deviation which is a difference between the target azimuth angle (the operation target value) and the actual azimuth angle (actual amount of operation) is used as the driver's input and the actual steering angle (the actual amount of operation) is used as the driver's output and is a driver model to be a reference suitable for repeated use.

Here, the reference model setup unit 35 sets each reference model which is a driver model to be a reference suitable for repeated use in association with each of the multiple traveling scenes (see, FIG. 14). The reference model steering angle acquisition unit 37 acquires a reference model corresponding to the current traveling scene of the vehicle Ca which is identified by the traveling scene identification unit 34 from the reference model setup unit 35 and then acquires a reference model steering angle (a reference model operation amount) by inputting the azimuth deviation which is a difference between the target azimuth angle (the operation target value) and the actual azimuth angle (the actual amount of movement) into the acquired reference model. After that, the arousal level estimation unit 41 estimates a driver's arousal level which is an aspect of the state of the driver based on a reference model error obtained from the difference between the actual steering angle (the actual amount of operation) and the reference model steering angle (the reference model operation amount).

According to the studies carried out by the inventors of the present invention, it has been proved that a function which is required for the driver model is such that when an azimuth deviation is inputted, a driver model steering angle (a driver model operation amount) is outputted and thus even in the case where a certain driver model is repeatedly used, it is highly probable that an arousal level estimation accuracy is not damaged so much as long as the driver model is properly set.

For this reason, the arousal level estimation device 11C according to the third embodiment of the present invention adopts the configuration in which the driver model to be a reference suitable for repeated use is set as a reference model and this reference model is repeatedly used.

The driver model which is set as the reference model is irrespective of whether it is created by the driver model creation unit 27 which is a component of the third arousal level estimation device 11C mounted on the vehicle Ca or is created, so-called, off-line, under the condition that the driver model to be a reference suitable for repeated use is set as a reference model.

The third arousal level estimation device 11C can reduce loads on information processing relating to successive creation of the driver model and provide the arousal level estimation processing at a higher speed as a whole.

Moreover, according to the studies carried out by the inventors of the present invention, it has been proved that the relationship between the driver's input and the driver's output changes depending on the traveling scenes of the vehicle. Accordingly, when a same reference model is repeatedly and continuously used under the condition that a traveling scene of a vehicle changes from moment to moment, a case where a mismatch is caused between a vehicle's current traveling scene and a characteristic of the reference model (suitable for any of traveling scenes). This may unwillingly cause deterioration of the arousal level estimation accuracy.

For this reason, the third arousal level estimation device 11C may adopt the configuration in which each reference model which is a driver model to be a reference suitable for repeated use is set in association with each of the predetermined multiple traveling scenes and the reference model corresponding to a current traveling scene of the vehicle is read as needed when the vehicle is traveling.

The third arousal level estimation device 11C can suppresses the deterioration of the arousal level estimation accuracy even when the traveling scene of the vehicle changes from moment to moment.

The third arousal level estimation device 11C may adopt the configuration in which a driver model creation unit 27 to create a driver model is further included and the reference model setup unit 35 sets a driver model to be a reference suitable for repeated use as a reference model among the driver models created in the past by the driver model creation unit 27.

The third arousal level estimation device 11C can bear the effects of reducing loads on the information processing and providing the estimation processing at a higher speed as a whole as well as the effect of suppressing the deterioration of the arousal level estimation accuracy and also can easily set a reference model. Also, when it is assumed that the third arousal level estimation device 11C is used in a case where a party of the driver model is same as the driver, the arousal level estimation accuracy can be expectedly improved.

Also, the third arousal level estimation device 11C further includes a driver model steering angle acquisition unit 31 to acquire a driver model steering angle (a driver model operation amount) by inputting an azimuth deviation which is a difference between the target azimuth angle (the operation target value) and the actual azimuth angle (the actual amount of movement) into the driver model. The reference model setup unit 35 may adopt the configuration in which the driver model is set as a reference model corresponding to the traveling scene, which is used when a residual with a smallest value is obtained as the residual which is obtained from a difference between the actual steering angle (the actual operation amount) and the driver model steering angle (the driver model operation amount) acquired by the driver model steering angle acquisition unit 31 during an initialization period from timing of starting an operation of the vehicle Ca as a starting point or from timing of a change in a traveling scene as a starting point till a predetermined period of time elapses.

During the initialization period from timing of starting an operation of the vehicle Ca as a starting point till a predetermined period of time elapses or from timing of a change in a traveling scene as a starting point till a predetermined period of time elapses, the driver's arousal level is higher than that in other periods of time. Specifically, at timing just after a driver starts driving or a traveling scene changes, the driver unlikely causes drowsiness. In the period when the driver's arousal level is relatively high, when the driver model which is used when the residual with the smallest value (a driver model close to an ideal with least variation of an output with respect to an input) is set as a reference model corresponding to the traveling scene, the deterioration of the arousal level estimation accuracy can be strongly suppressed. This is because the driver model which is set as a reference model corresponding to the traveling scene is set in consideration of the least variation of an output with respect to an input.

The third arousal level estimation device 11C can bear the effects of reducing the loads on the information processing and providing the arousal level estimation at a higher speed as a whole and also can strongly suppress the deterioration of the arousal level estimation accuracy.

Also, the third arousal level estimation device 11C may adopt the configuration in which the traveling scene identification unit 34 performs sequential smoothing processing on the time series data relating to at least one of the actual azimuth angle (the actual amount of movement) of the vehicle Ca or the actual steering angle (the actual amount of operation) of the driver, and identifies the current traveling scene of the vehicle Ca based on the actual movement amount data of the vehicle Ca or the actual operation amount data of the driver after the smoothing processing and attribute information of the multiple traveling scenes (e.g., if the vehicle Ca travels on a straight road or a gently curved road or a sharply curved road).

Also, the traveling scene identification unit 34 may adopt the configuration in which the sequential smoothing processing is performed on the time series data relating to the actual azimuth angle (the actual amount of movement) of the vehicle Ca detected by the yaw rate sensor 15 of the vehicle Ca and the current traveling scene of the vehicle Ca is identified based on the actual azimuth angle (the actual amount of movement) data after the smoothing processing and the attribute information of the multiple traveling scenes.

Also the traveling scene identification unit 34 may adopt the configuration in which the current traveling scene of the vehicle Ca is identified based on the actual steering angle (the actual amount of operation) of the driver and the attribute information of the multiple traveling scenes.

The third arousal level estimation device 11C can correctly identify the current traveling scene of the vehicle Ca. Accordingly, the effects of reducing the loads on the information processing and providing the arousal level estimation processing at a higher speed as a whole can be expected and the deterioration of the arousal level estimation accuracy can be suppressed in a further higher level.

Also, the third arousal level estimation device 11C may adopt the configuration in which the target azimuth angle acquisition unit 21 acquires a target azimuth angle (an operation target angle) of the driver based on the traveling road information relating to the moving direction of the vehicle Ca which is obtained by capturing an image by the image capturing unit 13 or is obtained through the navigation device.

In the third arousal level estimation device 11C, an acquiring route relating to the driver's operation target value is clearly defined. Accordingly, the effects of reducing the loads on the information processing and providing the arousal level estimation processing at a higher speed as a whole can be obtained and the target azimuth angle (the operation target value) of the driver can be precisely acquired.

Other Embodiments

The above-described embodiments are specific examples of the present invention. Accordingly, the technical scope of the present invention should not be limitedly interpreted. The present invention can be implemented in various embodiments without departing from the gist or important characteristic of the present invention.

Figure 15:
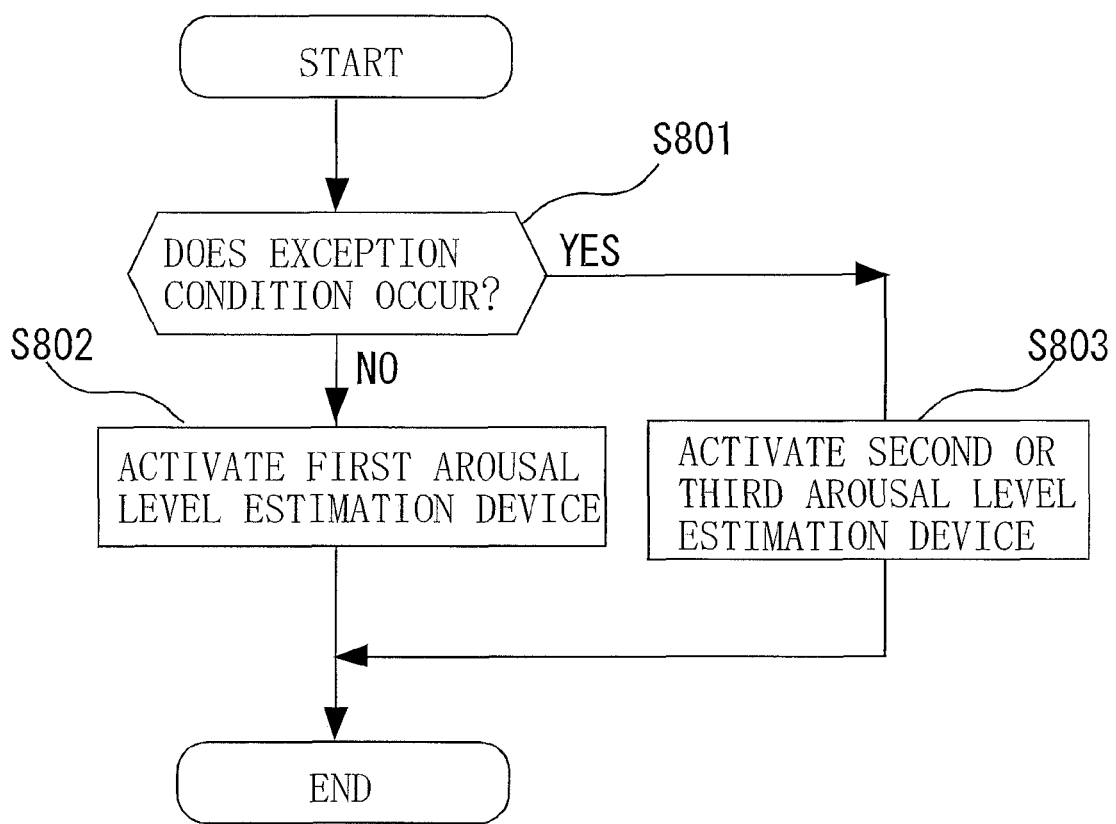
FIG. 15 is an illustration showing a procedure of activating a proper arousal level estimation device among the first to third arousal estimation devices in an arousal level estimation device in which the first to third arousal level estimation devices are integrated.

For example, in an arousal level estimation device integrally including the first to third arousal level estimation devices 11A, 11B, and 11C, a management device (e.g., any one of the first to third ECUs 20A, 20B, and 20C) managing the operations of the first to third arousal level estimation devices 11A, 11B, and 11C may adopt the configuration in which a proper arousal level estimation device is activated among the first to third arousal level estimation devices 11A, 11B, and 11C by using the procedure shown in FIG. 15.

In other words, the management device generally activates the first arousal level estimation device 11A. More specifically, the management device determines if a predetermined exception condition which is determined in advance occurs (step S801). When it is determined as a result of the determination at step S801 that the predetermined exception condition is not occurred ("No" at step S801), the management device activates the first arousal level estimation device 11A (step S802).

On the other hand, when it is determined as a result of the determination at step S801 that the predetermined exception condition occurs ("Yes" at step S801), the management device activates any one of the second arousal level estimation device 11B and the third arousal level estimation device 11C (step S803).

The predetermined exception condition may be adopted as follows: for example, first, a steering assisting function is operating in a driving support device having the steering assisting function (identifying a driver model may be disturbed when the steering assisting function is operating); second, it is detected that the driver model is in an abnormal state (a case where a model error exceeds a predetermined value which is determined in advance continues more than a predetermined period of time); and third, it is detected that the CPUs included in the first to third ECUs 20A, 20B, and 20C are in a state of being highly loaded.

With this configuration, a proper arousal level estimation device of the first to third arousal level estimation devices 11A, 11B, and 11C can be activated depending on if the predetermined exception condition occurs.

For example, although the target azimuth angle is shown as an example of the operation target value in the descriptions of the first to third arousal level estimation devices 11A, 11B, and 11C, the present invention is not limited to the above example. A target displacement allowable amount which is a target value of a displacement allowable amount with respect to a vehicle width direction by using the driving lane as a reference may be used as an operation target value. In this case, it may be adopted that the actual amount of movement and the actual steering angle are respectively replaced with an actual displacement amount and an actual steering angle.

Also, although the description is given of the case as an example where the stages of the arousal level are set in 5 stages in the first to third arousal level estimation devices 11A, 11B, and 11C, the present invention is not limited to this example. The stages of the arousal level may be set in any number of stages.

Also, although the description is given of the case as an example where the alert control unit 43 causes the speaker 19 to generate an alarming sound when the stage of the arousal level satisfies a predetermined condition in the descriptions of the first to third arousal level estimation devices 11A, 11B, and 11C, the present invention is not limited to the example. It may be adopted that an alarm urging a driver to be awakened may include a mode which stimulates a sense of sight, a sense of touch, or a sense of smell in addition to the sense of hearing. Also, a mode which simultaneously stimulates any combination of the multiple senses of hearing, sight, touch, and smell of the driver may be adopted.

Also, although in the descriptions of the first to third arousal level estimation devices 11A, 11B, and 11C, each of the first to third arousal level estimation devices 11A, 11B, and 11C is described as an example as an aspect for embodying the driver state estimation device according to the present invention, the present invention is not limited to the example. This is because the driver state estimation device according to the present invention uses a concept of a driver model and is a comprehensive concept including all having the function to estimate a state of a driver who is, for example, driving while asleep, after drinking, inattentively driving or unthinkingly driving.

When the driver model created, so-called, offline used as a reference model in the second arousal level estimation device 11B or the third arousal level estimation device 11C, the driver model creation unit 27, the driver model steering angle acquisition unit 31, and the residual calculation unit 33 which are commonly included in the second ECU 20B and the third ECU 20C may be omitted.

Although in the description of the first embodiment of the present invention, the description is given of the case as an example where the first ECU 20A of the first arousal level estimation device 11A has the target azimuth angle acquisition unit 21, the actual azimuth angle acquisition unit 23, the azimuth deviation calculation unit 25, the driver model creation unit 27, the band-pass filter 29, the driver model steering angle acquisition unit 31, the residual calculation unit 33, the traveling scene identification unit 34, the residual storage unit 36, the initial residual setup unit 38, the residual change rate computation unit 40, the arousal level estimation unit 41, and the alert control unit 43 as a form of software, the present invention is not limited to this example.

These various kinds of functional units 21, 23, 25, 27, 29, 31, 33, 34, 36, 38, 40, 41, and 43 may be configured as a form of hardware.

As similar to the above, although in the description of the second and third embodiments of the present invention, the description is given of the case as an example where the second ECU 20B and third ECU 20C have the reference model setup unit 35, the reference model steering angle acquisition unit 37, and the reference model error calculation unit 39 as a form of software, the present invention is not limited to this example.

These various kinds of functional units 35, 37, and 39 may be also configured as a form of hardware.

EXPLANATION OF REFERENCE SIGNS

11A First arousal level estimation device (driver state estimation device)
11B Second arousal level estimation device (driver state estimation device)
11C Third arousal level estimation device (driver state estimation device)
21 Target azimuth angle acquisition unit (operation target value acquisition unit)
23 Actual azimuth angle acquisition unit (actual movement amount acquisition unit)
25 Azimuth deviation calculation unit
27 Driver model creation unit
29 Band-pass filter
31 Driver model steering angle acquisition unit (driver model operation amount acquisition unit)
33 Residual calculation unit
34 Traveling scene identification unit
36 Residual storage unit
38 Initial residual setup unit
40 Residual change rate computation unit
41 Arousal level estimation unit (driver state estimation unit)
43 Alert control unit

The invention claimed is:
1. A system for alarming a driver comprising:
a driver state estimation device for estimating a state of a driver driving a vehicle; and
a stimulating device for stimulating at least one sense of the driver, the at least one sense of the driver being selected from among a sense of sight, a sense of touch, and a sense of hearing,
wherein the system alarms the driver by stimulating the at least one sense of the driver using the stimulating device based on the state of the driver estimated by the driver state estimation device, wherein the driver state estimation device comprises:
an operation target value acquisition unit configured to acquire an operation target value of the driver;
an actual movement amount acquisition unit configured to acquire an actual movement amount of the vehicle;
an actual operation amount acquisition unit configured to acquire an actual operation amount of the driver;
a driver model creation unit configured to create a driver model defining a relationship between a driver's input and a driver's output by using a difference between the operation target value and the actual movement amount as the driver's input and the actual operation amount of the driver as the driver's output;
a driver model operation amount acquisition unit configured to acquire a driver model operation amount by inputting the difference between the operation target value and the actual movement amount into the driver model;
a residual calculation unit configured to calculate a reference model error as a residual, which is obtained from a difference between the actual operation amount of the driver and the driver model operation amount;
an initial residual setup unit configured to set the residual to be a reference of the driver as an initial residual by choosing among residuals calculated by the residual calculation unit during an initialization period, which elapses during a predetermined period from a point of starting an operation of the vehicle or elapses during a predetermined period of time from a point of a change in a traveling scene including a condition of a traveling road of the vehicle; and
a driver state estimation unit configured to estimate the state of the driver based on the residual calculated by the residual calculation unit,
wherein the driver state estimation unit estimates the state of the driver based on a result of comparing the initial residual set by the initial residual setup unit with the residual calculated by the residual calculation unit after the initialization period has elapsed.

2. The system according to claim 1, wherein the driver state estimation device further comprises a residual storage unit configured to store the residual calculated by the residual calculation unit during the initialization period,
wherein the initial residual setup unit sets the residual with a smallest value as the initial residual among the residuals stored in the residual storage unit.

3. The system according to claim 2, wherein the driver state estimation device further comprises a residual change rate computation unit configured to compute a change rate of the residual with respect to the initial residual,
wherein the driver state estimation unit estimates the state of the driver based on the change rate of the residual with respect to the initial residual which is computed by the residual change rate computation unit.

4. The system according to claim 2, wherein the driver state estimation device further comprises a traveling scene identification unit configured to identify a current traveling scene of the vehicle among a plurality of predetermined traveling scenes based on at least one of the actual movement amount of the vehicle and the actual operation amount of the driver,
wherein the residual storage unit stores the residual calculated by the residual calculation unit during the initialization period in association with the traveling scene identified by the traveling scene identification unit, and the initial residual setup unit sets the residual with the smallest value as the initial residual among the residuals which are stored in the residual storage unit in association with the traveling scenes identified by the traveling scene identification unit during the initialization period.

5. The system according to claim 4,
wherein the traveling scene identification unit performs sequential smoothing processing on time series data relating to at least one of the actual movement amount of the vehicle and the actual operation amount of the driver, and identifies the current traveling scene of the vehicle based on data of the actual movement amount of the vehicle or data of the actual operation amount of the driver after the smoothing processing and attribute information of the plurality of traveling scenes.

6. The system according to claim 4,
wherein the traveling scene identification unit performs sequential smoothing processing on time series data relating to the actual movement amount of the vehicle which is detected by a yaw rate sensor of the vehicle and identifies the current traveling scene of the vehicle based on data of the actual movement amount after the smoothing processing and attribute information of the plurality of traveling scenes.

7. The system according to claim 1,
wherein the operation target value acquisition unit acquires the operation target value of the driver based on traveling road information relating to a moving direction of the vehicle which is obtained by capturing an image by an image capturing unit or is obtained through a navigation device.

8. A system for alarming a driver comprising:
a driver state estimation device for estimating a state of a driver driving a vehicle; and
a stimulating device for stimulating at least one sense of the driver, the at least one sense of the driver being selected from among a sense of sight, a sense of touch, and a sense of hearing,
wherein the system alarms the driver by stimulating the at least one sense of the driver using the stimulating device based on the state of the driver estimated by the driver state estimation device,
wherein the driver state estimation device comprises:
an operation target value acquisition unit configured to acquire an operation target value of the driver;
an actual movement amount acquisition unit configured to acquire an actual movement amount of the vehicle;
an actual operation amount acquisition unit configured to acquire an actual operation amount of the driver;
a reference model setup unit configured to set as a reference model a driver model to be a reference suitable for repeated use, the driver model defining a relationship between a driver's input and a driver's output by using a difference between the operation target value and the actual movement amount as the driver's input and the actual operation amount of the driver as the driver's output;
a reference model operation amount acquisition unit configured to acquire a reference model operation amount by inputting the difference between the operation target value and the actual movement amount into the reference model; and
a driver state estimation unit configured to estimate the state of the driver based on a reference model error or a residual, which is obtained from the difference between the actual operation amount of the driver and the reference model operation amount.

9. The system according to claim 8, wherein the driver state estimation device further comprises a driver model creation unit configured to create the driver model, wherein the reference model setup unit sets a driver model to be a reference suitable for repeated use as the reference model among driver models created in the past by the driver model creation unit.

10. The system according to claim 9, wherein the reference model setup unit sets the driver model as the reference model, the driver model being created by the driver model creation unit using standard data falling within a range where the data is generally used as the driver's input and the driver's output.

11. The system according to claim 10, wherein the driver's input is a difference between a target azimuth angle and an actual azimuth angle, the driver's output is expressed by an actual steering angle of the vehicle, and the standard data relates to the driver's input and output in a state where a change amount of the actual steering angle per unit time is equal to or smaller than a predetermined value and in a case where the state has continued for a predetermined period of time.

12. The system according to claim 10, wherein the driver's input is a difference between a target vehicle position and an actual vehicle position, the driver's output is expressed by the actual steering angle of the vehicle, and the standard data relates to the driver's input and output in a state where a change amount of the actual steering angle per unit time is equal to or smaller than a predetermined value and in a case where the state has continued for a predetermined period of time.

13. The system according to claim 8, wherein the operation target value acquisition unit acquires the operation target value of the driver based on information on a moving direction of the vehicle which is obtained by an azimuth angle acquisition device.

14. The system according to claim 8, wherein the operation target value acquisition unit acquires the operation target value of the driver based on information on a driving lane position of the vehicle which is obtained through an image capturing unit.

15. The system according to claim 8, wherein the driver state estimation device further comprises a traveling scene identification unit configured to identify a current traveling scene of the vehicle among a plurality of traveling scenes which are predetermined as traveling environments including conditions of traveling roads of the vehicle based on at least one of the actual movement amount of the vehicle and the actual operation amount of the driver, wherein the reference model setup unit has the reference model set in association with each of the plurality of traveling scenes, and the reference model operation amount acquisition unit acquires the reference model operation amount by acquiring the reference model corresponding to the current traveling scene of the vehicle which is identified by the traveling scene identification unit from the reference model setup unit, and then inputting the difference between the operation target value and the actual movement amount into the acquired reference model.

16. The system according to claim 15, wherein the driver state estimation device further comprises:

a driver model creation unit configured to create the driver model; and a driver model operation amount acquisition unit configured to acquire a driver model operation amount by inputting the difference between the operation target value and the actual movement amount into the driver model, wherein the reference model setup unit sets the driver model as the reference model corresponding to the traveling scene, the driver model having been used when the residual with a smallest value is obtained as the residual obtained by the difference between the actual operation amount and the driver model operation amount acquired by the driver model operation amount acquisition unit during an initialization period, which elapses from timing of starting an operation of the vehicle or elapses during a predetermined period of time from timing of a change in the traveling scene as a starting point.

17. The system according to claim 15, wherein the traveling scene identification unit performs sequential smoothing processing on time series data relating to at least one of the actual movement amount of the vehicle and the actual operation amount of the driver, and identifies the current traveling scene of the vehicle based on data of the actual movement amount of the vehicle or data of the actual operation amount of the driver after the smoothing processing and attribute information of the plurality of traveling scenes.

18. The system according to claim 17, wherein the traveling scene identification unit performs sequential smoothing processing on time series data relating to the actual movement amount of the vehicle which is detected by a yaw rate sensor of the vehicle and identifies the current traveling scene of the vehicle based on the data of the actual movement amount after the smoothing processing and the attribute information of the plurality of traveling scenes.

19. The system according to claim 15, wherein the traveling scene identification unit identifies the current traveling scene of the vehicle based on the actual operation amount of the driver and attribute information of the plurality of traveling scenes.

20. The system according to claim 15, wherein the operation target value acquisition unit acquires the operation target value of the driver based on traveling road information relating to a moving direction of the vehicle which is obtained by capturing an image by an image capturing unit or is obtained through a navigation device.

* * * * *